(12) United States Patent
Sakamoto et al.

(10) Patent No.: US 11,772,803 B2
(45) Date of Patent: Oct. 3, 2023

(54) PARACHUTE DEVICE, FLIGHT DEVICE, AND FLYING BODY EJECTION MECHANISM

(71) Applicant: MINEBEA MITSUMI Inc., Nagano (JP)

(72) Inventors: Yuzuru Sakamoto, Fujisawa (JP); Shoji Shimohisa, Fujisawa (JP); Yoshihiro Mochida, Minamisouma (JP)

(73) Assignee: MINEBEA MITSUMI Inc., Nagano (JP)

( * ) Notice: Subject to any disclaimer, the term of this patent is extended or adjusted under 35 U.S.C. 154(b) by 98 days.

(21) Appl. No.: 17/596,603

(22) PCT Filed: May 1, 2020

(86) PCT No.: PCT/JP2020/018421
§ 371 (c)(1),
(2) Date: Dec. 14, 2021

(87) PCT Pub. No.: WO2021/014712
PCT Pub. Date: Jan. 28, 2021

(65) Prior Publication Data
US 2022/0348337 A1 Nov. 3, 2022

(30) Foreign Application Priority Data

Jul. 24, 2019 (JP) ................................ 2019-136094

(51) Int. Cl.
*B64D 17/72* (2006.01)
*B64D 17/80* (2006.01)
*B64U 70/83* (2023.01)

(52) U.S. Cl.
CPC ............. *B64D 17/72* (2013.01); *B64D 17/80* (2013.01); *B64U 70/83* (2023.01)

(58) Field of Classification Search
CPC ...... B64D 17/72; B64D 17/725; B64D 17/80; B64U 70/83; F41H 13/0006
See application file for complete search history.

(56) References Cited

U.S. PATENT DOCUMENTS 4,912,869 A * 4/1990 Govett ...................... F41C 7/00
42/105
9,134,099 B2 * 9/2015 Tseng .................. F41H 13/0006
(Continued)

FOREIGN PATENT DOCUMENTS

| CN | 201724605 U * | 1/2011 |
| JP | 58-118498 A | 7/1983 |

(Continued)

OTHER PUBLICATIONS

Notice of Reasons for Refusal dated May 16, 2022 for corresponding Japanese Application No. 2019-136094 and English translation.
(Continued)

*Primary Examiner* — Joseph W Sanderson
(74) *Attorney, Agent, or Firm* — Pearne & Gordon LLP

(57) ABSTRACT

A device is provided for preventing a parachute from being damaged. A parachute device (4) includes a flying body (43) including a parachute (400), a parachute accommodation section (40) configured to accommodate the parachute, at least one flying body (43) connected to the parachute, an ejection section (41) having a tube shape and configured to hold the flying body and to eject the held flying body, a gas generating device (60) configured to generate gas, and an extrusion member (42) capable of being at least partially inserted into the ejection section, the extrusion member being configured to extrude the flying body from the ejection section due to receiving pressure of the gas generated from the gas generating device.

11 Claims, 12 Drawing Sheets

(56) References Cited

U.S. PATENT DOCUMENTS

| | | | | |
|---|---|---|---|---|
| 10,106,264 B1* | 10/2018 | Robertson | ............... | B64D 17/80 |
| 2015/0168107 A1* | 6/2015 | Tseng | ...................... | F41B 11/00 |
| | | | | 124/56 |
| 2016/0251083 A1 | 9/2016 | Tsaliah et al. | | |
| 2017/0356726 A1* | 12/2017 | Theiss | ................... | B64C 39/024 |
| 2020/0108939 A1 | 4/2020 | Tsaliah et al. | | |
| 2020/0115049 A1* | 4/2020 | Nakamura | ............ | B64D 17/025 |
| 2022/0127006 A1* | 4/2022 | Sakamoto | ............ | B64D 17/725 |
| 2022/0227495 A1* | 7/2022 | Sakamoto | .............. | B64D 17/80 |
| 2022/0363399 A1* | 11/2022 | Sakamoto | .............. | B64D 25/00 |

FOREIGN PATENT DOCUMENTS

| | | | | |
|---|---|---|---|---|
| JP | 4785084 B | 10/2011 | | |
| JP | 2018-193055 A | 12/2018 | | |
| JP | 2019-014320 A | 1/2019 | | |
| WO | WO-2018224528 A1 * | 12/2018 | .............. | F41H 11/02 |
| WO | WO-2021161685 A1 * | 8/2021 | | |

OTHER PUBLICATIONS

International Search Report for corresponding International Application No. PCT/JP2020/018421 dated Jun. 23, 2020.
Written Opinion for corresponding International Application No. PCT/JP2020/018421 dated Jun. 23, 2020.
International Preliminary Report on Patentability for corresponding International Application No. PCT/JP2020/018421 dated Jan. 7, 2021.

* cited by examiner

PARACHUTE DEVICE, FLIGHT DEVICE, AND FLYING BODY EJECTION MECHANISM

CROSS-REFERENCE TO RELATED APPLICATIONS

This application is a U.S. national stage application of PCT/JP2020/018421, which claims the benefit of Japanese Application No. 2019-136094, filed Jul. 24, 2019, the entire disclosures of which are hereby incorporated herein by reference.

TECHNICAL FIELD

The present invention relates to a parachute device, a flight device, and a flying body ejection mechanism, and relates to, for example, a parachute device attached to a flight device being of the multi-rotor rotary wing aircraft type capable of remote control and autonomous flight.

BACKGROUND ART

In recent years, practical use of flight devices being of the multi-rotor rotary wing aircraft type capable of remote control and autonomous flight (hereinafter, also simply referred to as "rotary wing aircraft") in industrial fields has been considered. For example, in the transportation industry, transport of loads, transport of passengers, and the like by using a rotary wing aircraft (so-called drone) have been considered.

A rotary wing aircraft for transport has an autonomous flight function of flying while identifying an own position by global positioning system (GPS) signals or the like. However, when an abnormality occurs in the rotary wing aircraft due to some cause, there is a risk that autonomous flight may not be possible and an accident such as falling of the rotary wing aircraft may occur. Thus, improvement in safety of the rotary wing aircraft is desired.

In particular, it is expected that the body size of rotary wing aircraft for transport will increase so as to be able to transport larger loads and passengers. When such a large rotary wing aircraft is in an uncontrollable state and falls due to some cause, there is a risk of severe damage to people or structures compared to known rotary wing aircraft. Due to this, when the size of the rotary wing aircraft is increased, safety needs to be emphasized more than ever.

Thus, the inventors of the present application have investigated attaching a parachute device to a rotary wing aircraft in order to improve the safety of the rotary wing aircraft.

For example, Patent Document 1 discloses a parachute deployment device for a rotary wing aircraft having a structure in which a plurality of projectiles are disposed inserted through a hollow tube communicating with a container equipped with a gas generator, and each projectile and a parachute are connected by using cords. This parachute deployment device allows the parachute to be forcibly opened by generating gas from the gas generator and ejecting the projectiles from ejection stands when the rotary wing aircraft falls.

CITATION LIST

Patent Literature

Patent Document 1: US 2016/251,083 A

SUMMARY OF INVENTION

Technical Problem

In the parachute deployment device disclosed in Patent Document 1, high-temperature gas is discharged from the hollow tube together with the ejection of the projectiles. When a parachute body (canopy) of the parachute ejected from the parachute device and a hanging line touch the high-temperature gas, there is a possibility that the parachute is damaged and the flight device (rotary wing aircraft) is not allowed to fall in a safe manner.

The present invention has been made in view of the problem described above, and an object of the present invention is to prevent a parachute from being damaged in a parachute device capable of ejecting a flying body and forcibly opening the parachute.

Solution to Problem

A parachute device according to a typical embodiment of the present invention includes a parachute, a parachute accommodation section configured to accommodate the parachute, at least one flying body connected to the parachute, an ejection section having a tube shape, and configured to hold the flying body and to eject the flying body held, a gas generating device configured to generate gas, and an extrusion member capable of being at least partially inserted into the ejection section, the extrusion member being configured to extrude the flying body from the ejection section due to receiving pressure of the gas generated from the gas generating device.

Advantageous Effects of Invention

According to an aspect of the present invention, it is possible to prevent a parachute from being damaged.

DESCRIPTION OF EMBODIMENTS

1. Overview of Embodiment

Figure 1:
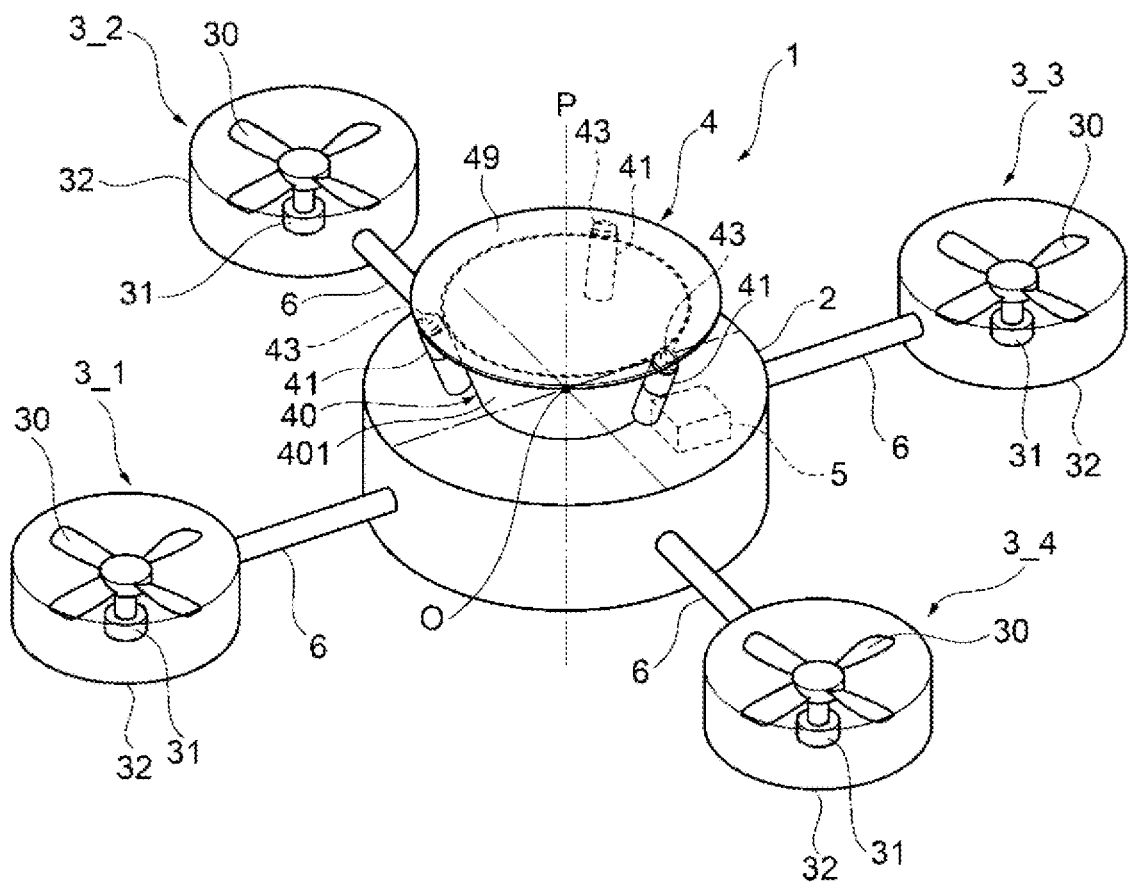
FIG. 1 is a diagram schematically illustrating an appearance of a flight device equipped with a parachute device according to Embodiment 1.

First, an overview of a typical embodiment of the invention disclosed in the present application will be described. Note that, in the following description, reference signs in the drawings corresponding to the constituent elements of the invention are mentioned in parentheses as an example.

[1] A parachute device (4, 4A) according to a typical embodiment of the present invention includes a parachute (400), a parachute accommodation section (40) configured to accommodate the parachute, at least one flying body (43) connected to the parachute, an ejection section (41, 41A) having a tube shape, and configured to hold the flying body and to eject the flying body held, a gas generating device (60, 60A) configured to generate gas, and an extrusion member (42, 42A) capable of being at least partially inserted into the ejection section, the extrusion member being configured to extrude the flying body from the ejection section due to receiving pressure of the gas generated from the gas generating device.

[2] In the parachute device (4, 4A) described above, a movement limiting section (412, 611) configured to limit a range of movement of the extrusion member may be further provided.

[3] In the parachute device (4) described above, a gas introduction path (48) configured to introduce the gas generated from the gas generating device to the ejection section may be further provided, the gas generating device may include a gas generating agent (601) configured to generate the gas, and a housing (600) configured to house the gas generating agent and including a gas discharge chamber (604) configured to discharge the gas generated from the gas generating agent, the ejection section may be configured to hold the flying body at one end side and may communicate with the gas discharge chamber through the gas introduction path at an other end side, the extrusion member may be accommodated in the ejection section, and the movement limiting section may limit the range of the movement of the extrusion member in the ejection section.

[4] In the parachute device (4) described above, the ejection section may include a first tube-shaped member (411), a second tube-shaped member (413) disposed so as to be coaxial with the first tube-shaped member, and a partition section (412) provided between the first tube-shaped member and the second tube-shaped member, the partition section covering respective end portions of the first tube-shaped member and the second tube-shaped member facing each other, the partition section serving as the movement limiting section, the flying body may be provided at the first tube-shaped member, the extrusion member may include a bar-shaped portion (421) and a pressure receiving section (422), the pressure receiving section being fixed to one end of the bar-shaped portion and configured to receive the pressure of the gas, and the partition section may be formed with a through hole (4120) capable of being inserted with the bar-shaped portion but not capable of being inserted with the pressure receiving section.

[5] In the parachute device (4A) described above, the gas generating device may include a gas generating agent (601) configured to generate the gas, and a housing (600A) configured to house the gas generating agent and including a gas discharge chamber (604A) configured to discharge the gas generated from the gas generating agent, the extrusion member may extend between the gas discharge chamber and the ejection section, the extrusion member may be accommodated in the gas discharge chamber at one end side, the extrusion member may be capable of being inserted into the ejection section at an other end side, and the movement limiting section may limit the range of the movement of the extrusion member in the gas discharge chamber.

[6] In the parachute device described above, the extrusion member may include a bar-shaped portion (421A) capable of being inserted into the ejection section at one end side, and a pressure receiving section (422A) fixed to an other end side of the bar-shaped portion, disposed in the gas discharge chamber, and configured to receive the pressure of the gas, the housing may include a tube-shaped portion (610) defining the gas discharge chamber and configured to movably house the pressure receiving section, and the tube-shaped portion may be formed with a through hole (6001) capable of being inserted with the bar-shaped portion but not capable of being inserted with the pressure receiving section.

[7] A flight device (1) according to a typical embodiment of the present invention may include an aircraft body unit (2), a thrust force generation section (3, 3_1 to 3_n) connected to the aircraft body unit and configured to generate a thrust force, a flight control section (14) configured to control the thrust force generation section, an abnormality detection section (15) configured to detect an abnormality during flying of the aircraft body unit, the above-described parachute device (4, 4A), and a fall control section (16) configured to cause the flying body to be ejected from the ejection section in response to detection of the abnormality by the abnormality detection section.

[8] A flying body ejection mechanism (50, 50A) according to a typical embodiment of the present invention includes a flying body (43) capable of being connected to a parachute (400), an ejection section (41, 41A) having a tube shape and configured to hold the flying body and to eject the flying body held, a gas generating device (60, 60A) configured to generate gas, and an extrusion member (42, 42A) capable of being at least partially inserted into the ejection section, the extrusion member being configured to extrude the flying body from the ejection section due to receiving pressure of the gas generated from the gas generating device.

2. Specific Examples of Embodiment

Hereinafter, specific examples of the embodiments of the present invention will be described with reference to the accompanying drawings. Note that, in the following description, constituent elements common to each of the embodiments are denoted with the same reference signs and will not be described repeatedly. Furthermore, it should be noted that the drawings are schematic drawings and the dimensional relationships, proportions, and the like between elements in the drawings may differ from reality. Among the drawings, portions having mutually different dimensional relationships and proportions may be included.

Embodiment 1

FIG. 1 is a diagram schematically illustrating an appearance of a flight device equipped with a parachute device according to Embodiment 1. A flight device 1 illustrated in FIG. 1 is, for example, a flight device being of the multirotor rotary wing aircraft type equipped with three or more rotors, and is a so-called drone.

As illustrated in FIG. 1, the flight device 1 includes an aircraft body unit 2, thrust force generation sections 3_1 to 3_n (n being an integer equal to or greater than 3), a parachute device 4, a notification device 5, and arm sections 6.

The aircraft body unit 2 is a main body portion of the flight device 1. As will be described below, the aircraft body unit 2 accommodates various functional sections for controlling flying of the flight device 1. Note that in FIG. 1, the aircraft body unit 2 having a cylindrical shape is illustrated as an example, but a shape of the aircraft body unit 2 is not particularly limited.

The thrust force generation sections 3_1 to 3_n are rotors configured to generate a thrust force. Note that, in the following description, when each of the thrust force generation sections 3_1 to 3_n is not specifically distinguished, each of the thrust force generation sections is simply referred to as a "thrust force generation section 3".

The thrust force generation section 3 has, for example, a structure where a propeller 30, and a motor 31 configured to rotate the propeller 30 are accommodated in a case 32 having a tube shape. A net (for example, a resin material, a metal material (stainless steel, or the like), or the like) for preventing contact with the propeller 30 may be provided in an opening portion of the case 32 having the tube shape.

The number n of the thrust force generation sections 3 provided in the flight device 1 is not particularly limited, but is preferably three or more. For example, the flight device 1 may be any of a tricopter provided with three thrust force generation sections 3, a quadcopter provided with four thrust force generation sections 3, a hexacopter provided with six thrust force generation sections, and an octocopter provided with eight thrust force generation sections 3.

Note that in FIG. 1, a case of the flight device 1 being equipped with four (n=4) thrust force generation sections 3_1 to 3_4 and serving as a quadcopter is illustrated as an example.

An arm section 6 has a structure for connecting the aircraft body unit 2 and each of the thrust force generation sections 3. The arm section 6 is formed so as to radially protrude from the aircraft body unit 2, for example, from a central portion O of the aircraft body unit 2. Each of the thrust force generation sections 3 is attached respectively to a tip end of each of the arm sections 6.

The notification device 5 is a device for notifying the outside of the flight device 1 of danger. The notification device 5 is configured by including a light source formed of, for example, a light emitting diode (LED) or the like, or a sound generation device (an amplifier, a speaker, and the like). In response to detection of abnormalities by the abnormality detection section 15 to be described below, the notification device 5 notifies, by using light or sound, the outside of a dangerous state of the flight device 1.

Note that the notification device 5 may be exposed to the outside of the aircraft body unit 2, or may be accommodated in the interior of the aircraft body unit 2 in a form capable of outputting light generated from a light source, sound generated from a speaker, or the like to the outside.

The parachute device 4 is a device for slowing the falling speed of the flight device 1 and causing the flight device 1 to fall in a safe manner when an abnormality occurs in the flight device 1 and there is a risk of falling. As illustrated in FIG. 1, for example, the parachute device 4 is installed on the aircraft body unit 2. Note that the specific configuration of the parachute device 4 will be described later.

Figure 2:
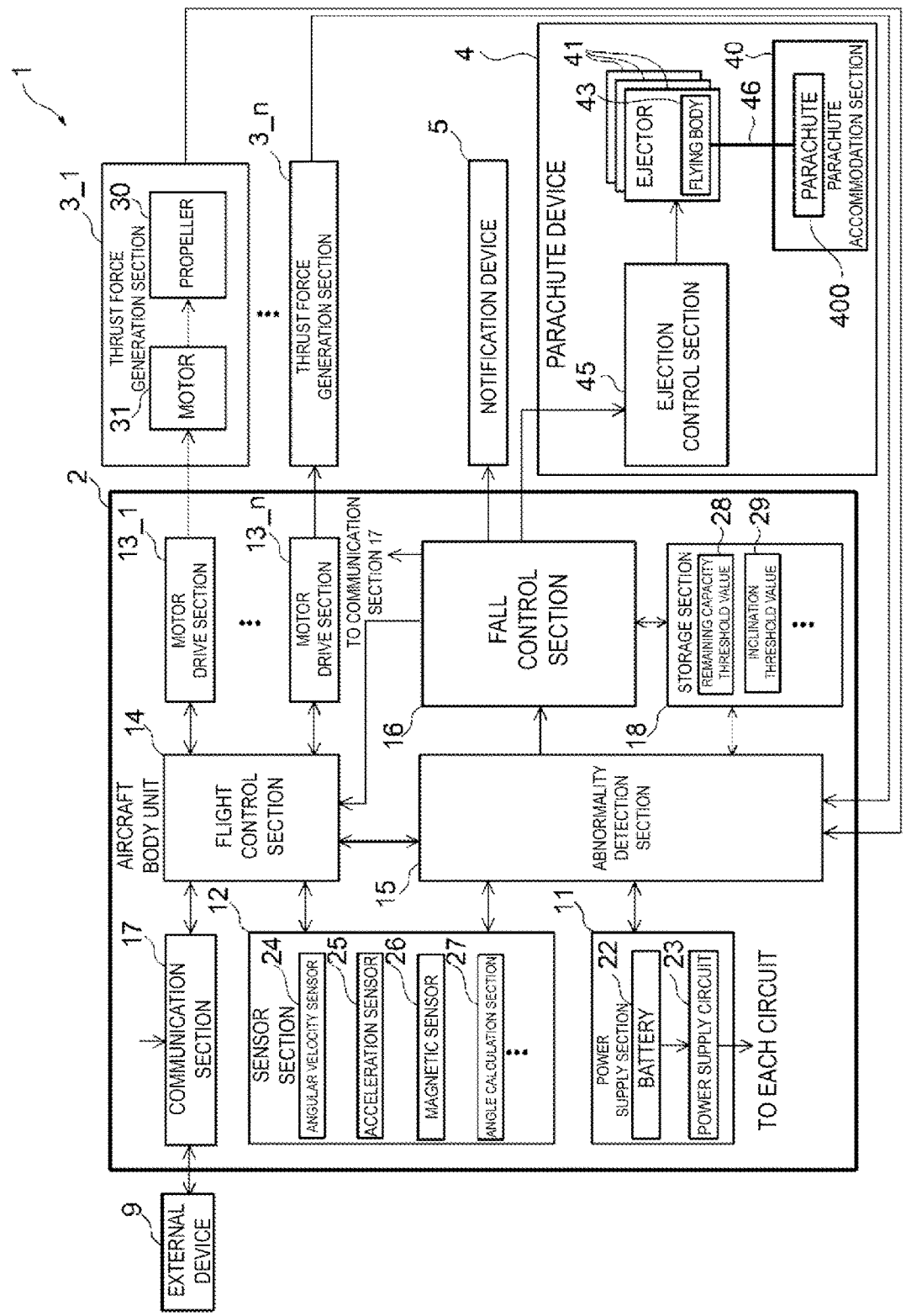
FIG. 2 is a functional block diagram of the flight device equipped with the parachute device according to Embodiment 1.

FIG. 2 is a functional block diagram of the flight device 1 equipped with the parachute device 4 according to Embodiment 1.

As illustrated in FIG. 2, the aircraft body unit 2 includes a power supply section 11, a sensor section 12, motor drive sections 13_1 to 13_n (n being an integer equal to or greater than 3), a flight control section 14, an abnormality detection section 15, a fall control section 16, a communication section 17, and a storage section 18.

Among these functional sections, the flight control section 14, the abnormality detection section 15, and the fall control section 16 are achieved by, for example, program processing by a program processing device (for example, a microcontroller) including a central processing unit (CPU) and a memory.

The power supply section 11 includes a battery 22 and a power supply circuit 23. The battery 22 is, for example, a secondary battery (for example, a lithium-ion secondary battery). The power supply circuit 23 is a circuit configured to generate a power supply voltage based on an output voltage of the battery 22 to supply the power supply voltage to each hardware entity configuring the above-described functional sections. The power supply circuit 23 includes, for example, a plurality of regulator circuits, and supplies a power supply voltage having an appropriate magnitude for each hardware described above.

The sensor section 12 is a functional section for detecting a state of the flight device 1. The sensor section 12 detects an inclination of the aircraft body of the flight device 1. The sensor section 12 includes, for example, an angular velocity sensor 24, an acceleration sensor 25, a magnetic sensor 26, and an angle calculation section 27.

The angular velocity sensor 24 is a sensor for detecting an angular velocity (rotational velocity). For example, the angular velocity sensor 24 is a tri axial gyro sensor configured to detect an angular velocity based on three reference axes of an x-axis, a y-axis, and a z-axis.

The acceleration sensor 25 is a sensor for detecting an acceleration. For example, the acceleration sensor 25 is a triaxial acceleration sensor for detecting an acceleration based on three reference axes of the x-axis, the y-axis, and the z-axis.

The magnetic sensor 26 is a sensor for detecting terrestrial magnetism. For example, the magnetic sensor 26 is a triaxial geomagnetic sensor (electronic compass) for detecting an azimuth (absolute direction) based on three reference axes of the x-axis, the y-axis, and the z-axis.

The angle calculation section 27 calculates an inclination of the aircraft body of the flight device 1 based on a detection result of at least one of the angular velocity sensor 24 and the acceleration sensor 25. Here, the inclination of the aircraft body of the flight device 1 is an angle of the aircraft body (the aircraft body unit 2) with respect to the ground (horizontal direction).

For example, the angle calculation section 27 may calculate an angle of the aircraft body with respect to the ground based on a detection result of the angular velocity sensor 24, or may calculate an angle of the aircraft body with respect to the ground based on detection results of the angular velocity sensor 24 and the acceleration sensor 25. Note that, as a method of calculating an angle by using detection results of the angular velocity sensor 24 and the acceleration sensor 25, a known calculation equation may be used.

Additionally, the angle calculation section 27 may correct, based on a detection result of the magnetic sensor 26, the angle calculated based on the detection result of at least one of the angular velocity sensor 24 and the acceleration sensor 25. Similarly to the flight control section 14 and the like, for example, the angle calculation section 27 is implemented by program processing by a microcontroller.

Note that, in addition to the angular velocity sensor 24, the acceleration sensor 25, and the magnetic sensor 26 described above, the sensor section 12 may include, for example, an air pressure sensor, an air volume (wind direction) sensor, an ultrasonic sensor, a GPS receiver, a camera, and the like.

The communication section 17 is a functional section for communicating with an external device 9. Here, the external device 9 is a transmitter, a server, or the like configured to control an operation of the flight device 1 and to monitor a status of the flight device 1. The communication section 17 is configured by, for example, a radio frequency (RF) circuit and the like. Communication between the communication section 17 and the external device 9 is achieved, for example, by wireless communication in an ISM band (2.4 GHz band).

The communication section 17 receives operation information of the flight device 1 transmitted from the external device 9 to output the operation information to the flight control section 14, and transmits various measurement data and the like measured by the sensor section 12 to the external device 9. In addition, when an abnormality of the flight device 1 is detected by the abnormality detection section 15, the communication section 17 transmits, to the external device 9, information indicating that an abnormality has occurred in the flight device 1. Furthermore, the communication section 17 transmits, to the external device 9, information indicating that the flight device 1 has fallen when the flight device 1 falls to the ground.

The motor drive sections 13_1 to 13_n are provided for the respective thrust force generation sections 3_n, and are functional sections for driving the motors 31 to be driven in accordance with an instruction from the flight control section 14.

Note that, in the following description, when each of the motor drive sections 13_1 to 13_n is not specifically distinguished, each of the motor drive sections 13_1 to 13_n is simply referred to as a "motor drive section 13".

The motor drive section 13 drives the motor 31 such that the motor 31 rotates at the number of rotations instructed from the flight control section 14. For example, the motor drive section 13 is an electronic speed controller (ESC).

The flight control section 14 is a functional section for comprehensively controlling the respective functional sections of the flight device 1.

The flight control section 14 controls the thrust force generation sections 3 so that the flight device 1 stably flies. Specifically, the flight control section 14 calculates the appropriate number of rotations of the motor 31 of each thrust force generation section 3 so that the aircraft body stably flies in a desired direction, based on operation information received by the communication section 17 from the external device 9 (instructions for ascending, descending, advancing, retreating, and the like), and detection results of the sensor section 12, and instructs the calculated number of rotations to each motor drive section 13.

The flight control section 14 calculates the appropriate number of rotations of the motor 31 of each thrust force generation section 3 such that the aircraft body becomes horizontal, based on a detection result of the angular velocity sensor 24 when a posture of the aircraft body is disturbed, for example, due to an external influence such as wind, and instructs the calculated number of rotations to each motor drive section 13.

In addition, for example, the flight control section 14 calculates the appropriate number of rotations of the motor 31 of each thrust force generation section 3 based on a detection result of the acceleration sensor 25 in order to prevent drift of the flight device 1 during hovering of the flight device 1, and instructs the calculated number of rotations to each motor drive section 13.

Additionally, the flight control section 14 controls the communication section 17 to achieve transmission and reception of the various data described above to and from the external device 9.

The storage section 18 is a functional section for storing various programs, parameters, and the like for controlling operations of the flight device 1. For example, the storage section 18 is configured of a non-volatile memory such as a flash memory and a ROM, a RAM, and the like.

The above-described parameters stored in the storage section 18 are, for example, a remaining capacity threshold value 28, an inclination threshold value 29, and the like to be described below.

The abnormality detection section 15 is a functional section for detecting an abnormality during flying. Specifically, the abnormality detection section 15 monitors detection results of the sensor section 12, a state of the battery 22, and operation states of the thrust force generation sections 3, and determines whether the flight device 1 is in an abnormal state.

Here, the abnormal state refers to a state where autonomous flight of the flight device 1 may become impossible. For example, a state where at least one of a case where the thrust force generation section 3 has broken down, a case where a remaining capacity of the battery 22 has dropped below a predetermined threshold value, and a case where the aircraft body (the aircraft body unit 2) is abnormally inclined occurs is referred to as the abnormal state.

When the abnormality detection section 15 detects a failure of the thrust force generation section 3, the abnormality detection section 15 determines that the flight device 1 is in the abnormal state. Here, the "failure of the thrust force generation section 3" refers to, for example, a case where the motor 31 does not rotate at the number of rotations specified by the flight control section 14, a case where the propeller 30 does not rotate, a case where the propeller 30 has broken down, and the like.

In addition, when the abnormality detection section 15 detects that the remaining capacity of the battery 22 has dropped below a predetermined threshold value (hereinafter, also referred to as the "remaining capacity threshold value") 28, the abnormality detection section 15 determines that the flight device 1 is in the abnormal state.

Here, the remaining capacity threshold value 28 may be such a capacity value that the motor cannot rotate at the number of rotations instructed by the flight control section 14, for example. The remaining capacity threshold value 28 is stored in advance in the storage section 18, for example.

In addition, when the abnormality detection section 15 detects an abnormal inclination of the flight device 1 (aircraft body), the abnormality detection section 15 determines that the flight device 1 is abnormal. For example, the abnormality detection section 15 determines that the flight device 1 is in the abnormal state when a state where an angle calculated by the angle calculation section 27 exceeds a predetermined threshold value (hereinafter, also referred to as the "inclination threshold value") 29 continues for a predetermined period of time.

For example, an angle (pitch angle) of movement of the flight device 1 in a front and rear direction and an angle (roll angle) of movement of the flight device 1 in a left and right direction are obtained in advance by an experiment. The inclination threshold value 29 may be set to a value larger than the angles obtained by the experiment. The inclination threshold value 29 is stored in advance in the storage section 18, for example.

The fall control section 16 is a functional section for controlling falling of the flight device 1. Specifically, when the abnormality detection section 15 detects that the flight device 1 is in the abnormal state, the fall control section 16 performs fall preparation processing for causing the flight device 1 to fall in a safe manner.

Specifically, the fall control section 16 performs the following processing as the fall preparation processing. In other words, the fall control section 16 controls the notification device 5 in response to the detection of the abnormality by the abnormality detection section 15, and notifies the outside of a dangerous state. In addition, the fall control section 16 controls the respective motor drive sections 13 in response to the detection of the abnormality by the abnormality detection section 15 to stop the rotation of each motor 31. Furthermore, in response to the detection of the abnormality by the abnormality detection section 15, the fall control section 16 outputs a control signal indicating opening of a parachute to the parachute device 4 to open a parachute 400.

Next, the parachute device 4 according to Embodiment 1 will be described in detail.

Figure 3A:
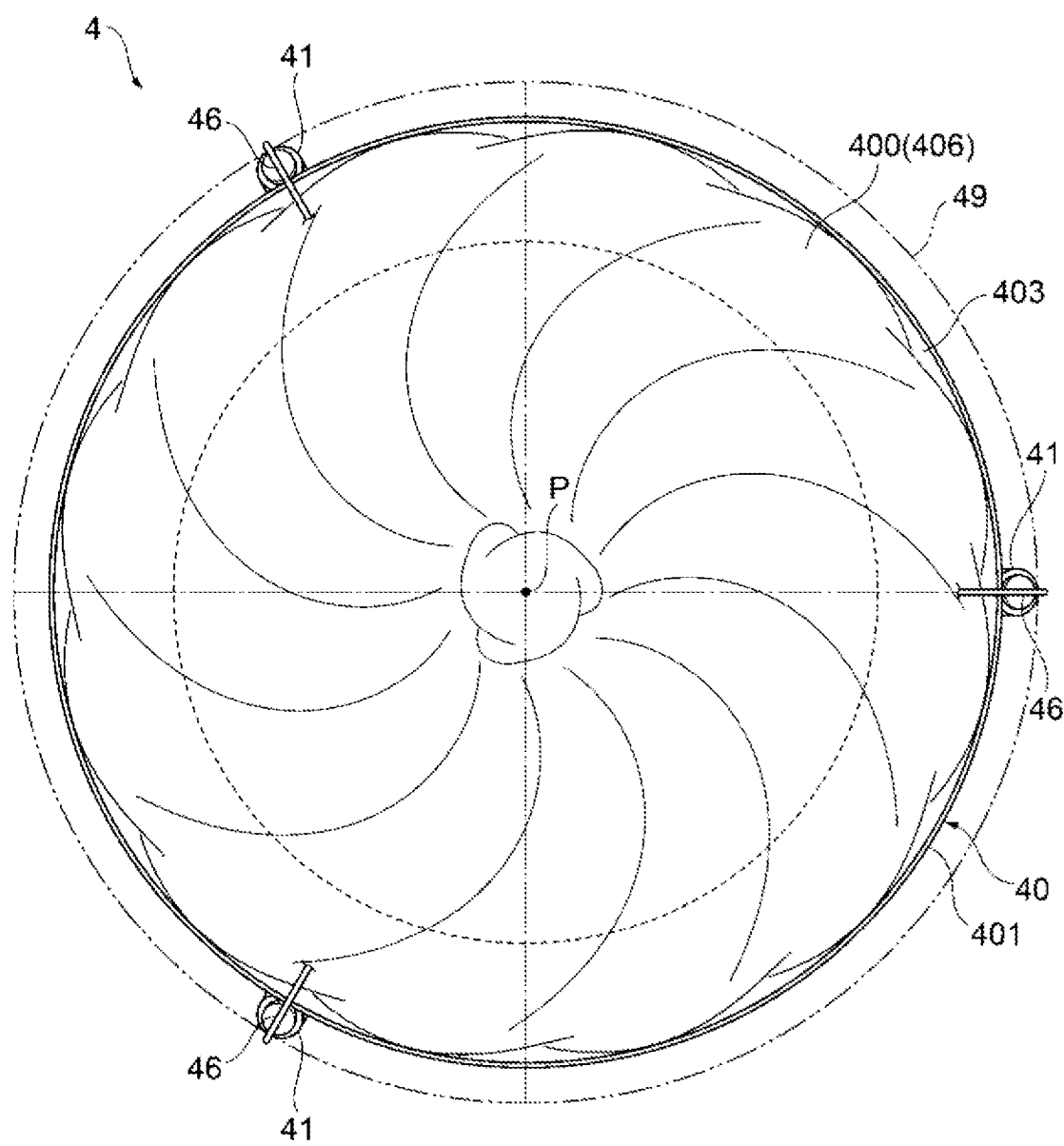
FIG. 3A is a diagram schematically illustrating a configuration of the parachute device according to Embodiment 1.
Figure 3B:
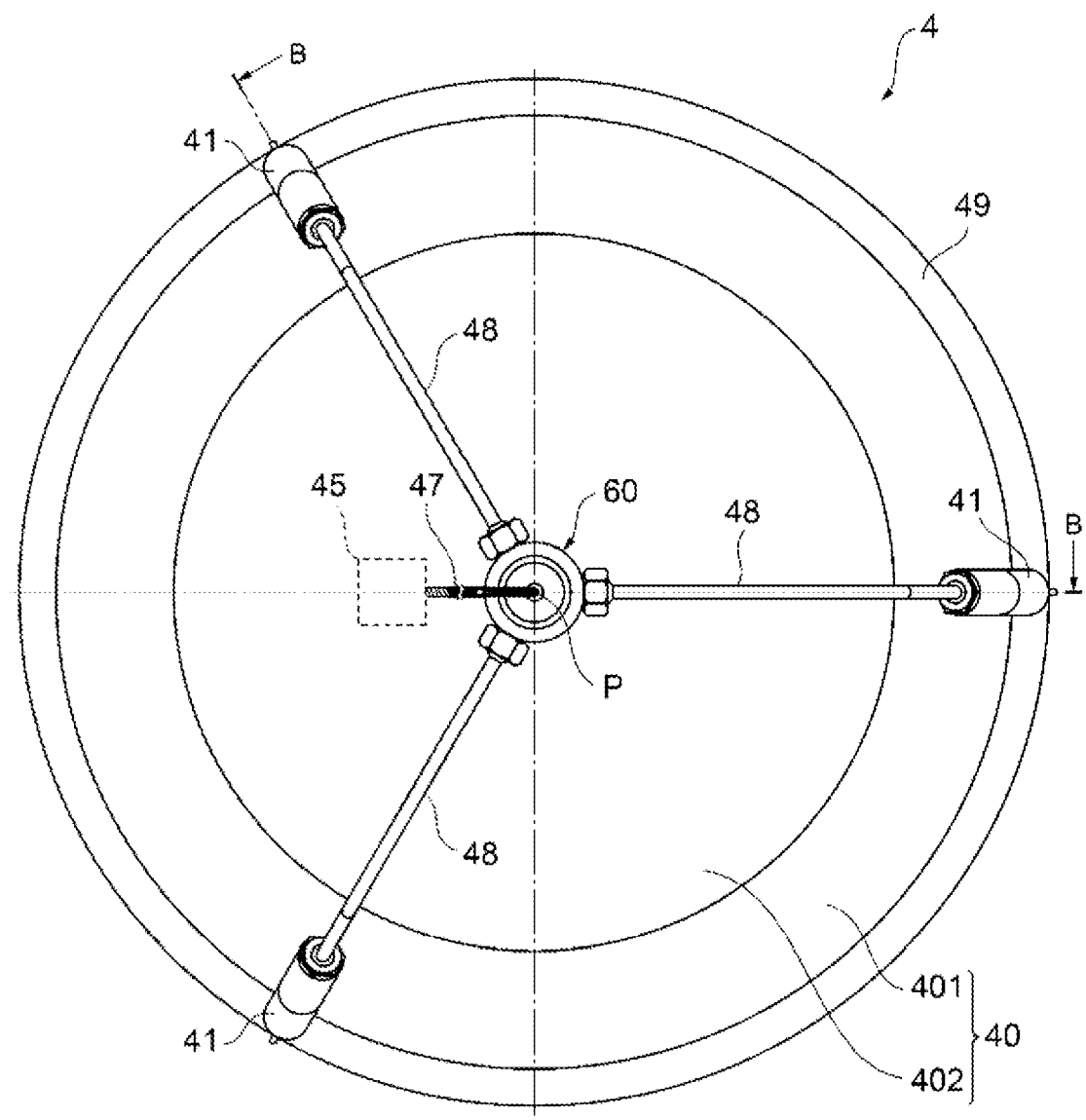
FIG. 3B is a diagram schematically illustrating the configuration of the parachute device according to Embodiment 1.
Figure 3C:
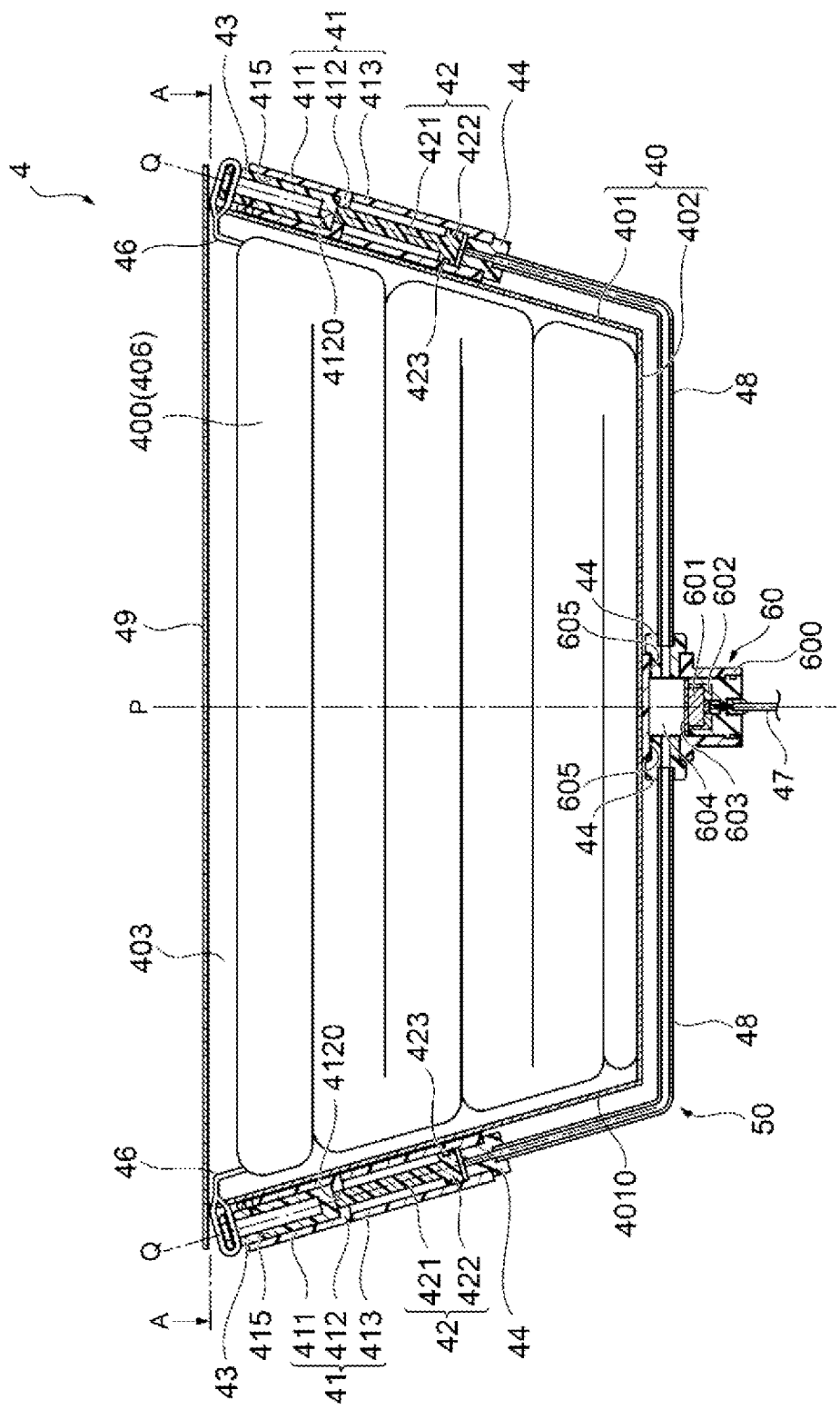
FIG. 3C is a diagram schematically illustrating the configuration of the parachute device according to Embodiment 1.

FIG. 3A to FIG. 3C are diagrams schematically illustrating a configuration of the parachute device 4 according to Embodiment 1. A top view of the parachute device 4 (an A-A plane in FIG. 3C) is illustrated in FIG. 3A, a bottom view of the parachute device 4 is illustrated in FIG. 3B, and a side cross section of the parachute device 4 (a cross section of the B-B portion in FIG. 3B) before ejection of the flying body 43 is illustrated in FIG. 3C.

As illustrated in FIG. 3A to FIG. 3C, the parachute device 4 includes a parachute 400, a parachute accommodation section 40, ejection sections 41, an ejection control section 45, flying bodies 43, a lead wire 47, and a cover member 49.

Figure 4:
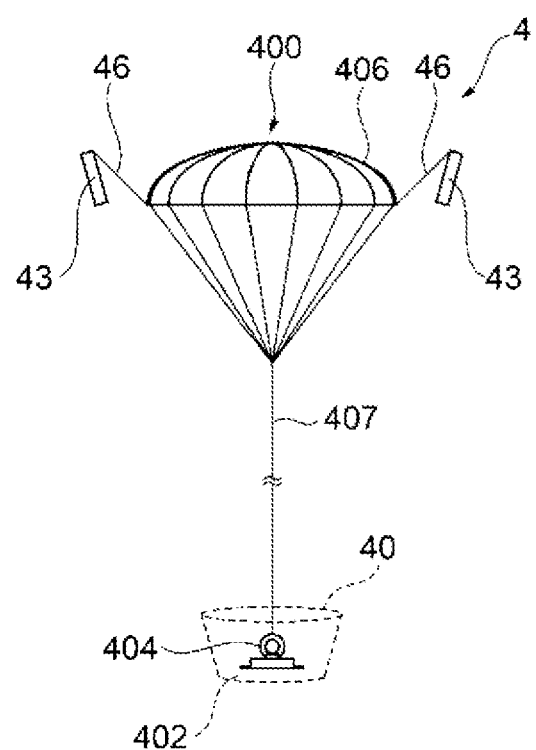
FIG. 4 is a diagram schematically illustrating a state with a parachute being open.

FIG. 4 is a diagram schematically illustrating a state with the parachute 400 being open.

As illustrated in the same figure, the parachute 400 includes a parachute body (canopy) 406, and a hanging line 407.

The hanging line 407 connects the parachute body 406 and the parachute accommodation section 40 (a parachute attachment section 404). The parachute body 406 is connected to the flying bodies 43 by the connection lines 46. For example, as illustrated in FIG. 4, the connection line 46 is connected to the parachute body 406 at an edge (peripheral edge) side from an apex of the parachute body 406. More specifically, the respective connection lines 46 are separated from one another and are connected to a peripheral edge portion of the parachute 400. For example, as illustrated in FIG. 4, when the shape of the parachute 400 in a view from the apex side when the parachute 400 opens is circular, each connection line 46 is connected to the parachute 400 (parachute body 406) along the circumferential direction of the peripheral edge portion of the parachute 400 at equal intervals.

Note that when only one flying body 43 is provided, the connection line 46 may be connected at any one position of the peripheral edge portion of the parachute 400. In this case, positions at the peripheral edge portion of the parachute 400 connected with the connection lines 46 are not particularly limited.

The connection line 46 is formed of, for example, a metal material (for example, stainless steel) or a fiber material (for example, a nylon string).

Here, a diameter D of the parachute body 406 required to cause the flight device 1 to fall at a low speed can be calculated, for example, based on Equation (1) below. In Equation (1), m is a total weight of the flight device 1, v is a falling speed of the flight device 1, $\rho$ is an air density, and Cd is a resistance coefficient.

[Equation 1]

$$D = \frac{2}{v}\sqrt{\frac{2mg}{\rho\pi \cdot Cd}} \qquad (1)$$

For example, when the total weight of the flight device 1 is m=250 (kg), the resistance coefficient is Cd=0.9, and the air density $\rho$=1.3 kg/m, a diameter D of the parachute body 406 required to make the falling speed v of the flight device 1 be 5 (m/s) is calculated to be 14.6 (m) from Equation (1).

For example, as illustrated in FIG. 3A to FIG. 3C, the parachute 400 is accommodated in the parachute accommodation section 40 with the parachute body 406 folded before its use.

The parachute accommodation section 40 is a container configured to accommodate the parachute 400. As illustrated in FIG. 3A to FIG. 3C, the parachute accommodation section 40 has, for example, a cylindrical shape having an opening at one end and having a bottom at the other end.

As illustrated in FIG. 1, the parachute accommodation section 40 is set at the upper surface of the aircraft body unit 2, that is, at a surface facing a side opposite to the ground during flying of the flight device 1. For example, the parachute accommodation section 40 is preferably installed such that the central portion O of the aircraft body unit 2 and a central axis P of the parachute accommodation section 40 overlap with each other at the upper surface of the aircraft body unit.

The parachute accommodation section 40 has a side wall portion 401 having a tube shape and a bottom portion 402 formed so as to close an opening at one end side of the side wall portion 401. The parachute accommodation section 40 is configured of, for example, resin. The side wall portion 401 and the bottom portion 402 may be integrally formed, for example, as a resin molded article, or may be formed as separated components and then joined to each other. In the present embodiment, description will be given as a component integrally molded with the side wall portion 401 and the bottom portion 402.

The side wall portion 401 has a tapered tube shape, for example. More specifically, the side wall portion 401 has a conical outer shape with an upper surface area and a lower surface area being different from each other.

In the parachute accommodation section 40, an accommodation space 403 for accommodating the parachute 400 is defined by the side wall portion 401 and the bottom portion 402.

The bottom portion 402 is provided with the parachute attachment section 404 for connecting the parachute accommodation section 40 and the parachute 400. For example, as illustrated in FIG. 4, by connecting one end of the hanging line 407 of the parachute 400 to the parachute attachment section 404, the parachute 400 and the parachute accommodation section 40 are connected.

The parachute accommodation section 40 may be provided with the cover member 49 configured to cover an opening portion of the side wall portion 401. The cover member 49 may be, for example, a lid made of a resin material, or a thin film member. As illustrated in FIG. 3C, the cover member 49 is preferably disposed to entirely cover an opening portion of the parachute accommodation section 40 so as to cover the flying bodies 43 and the ejection sections 41 disposed at the side wall portion 401. The cover member 49 is fixed to the parachute accommodation section 40 by a fastening force that allows the cover member 49 to be easily removed from the parachute accommodation section 40 when the flying bodies 43 are ejected.

The lead wire 47 is an electrical wire for igniting the gas generating device 60. The lead wire 47 is configured of, for example, a vinyl wire, a tin-plated wire, an enamel wire, or the like. One end of the lead wire 47 is connected to the gas generating device 60, and the other end of the lead wire 47 is connected to the ejection control section 45.

The ejection control section 45 ignites the gas generating device 60 through the lead wire 47 to generate gas from the gas generating device 60. The flying body 43 obtains a thrust force by indirectly receiving pressure of the gas generated from the gas generating device 60 through the extrusion member 42 to be ejected from the ejection section 41.

The parachute device 4 includes at least one flying body 43. For example, the parachute device 4 preferably includes three or more flying bodies 43. In the present embodiment, as an example, as illustrated in FIG. 1, a case of the parachute device 4 including three flying bodies will be exemplified and described. Note that a specific configuration of the flying body 43 will be described below.

The ejection control section 45 is a functional section configured to perform control for ejecting the flying body 43 from the ejection section 41. The ejection control section 45 is, for example, an electronic circuit configured to output an ignition signal when the ejection control section 45 receives a control signal indicating the opening of the parachute 400 from the fall control section 16 in the aircraft body unit 2. The ignition signal is input to the gas generating device 60 through the lead wire 47, and thus, an ignition agent 602 to be described later is ignited to generate gas from the gas generating device 60. The ejection control section 45 is fixed, for example, at an inner surface of the bottom portion 402 in the parachute accommodation section 40 or at an outer surface of the bottom portion 402.

The ejection sections 41, the extrusion members 42, the flying bodies 43, the gas introduction paths 48, and the gas generating device 60 configure one flying body ejection mechanism 50.

The ejection section 41 is a device configured to hold the flying body 43 to eject the held flying body 43. The ejection section 41 is provided for each flying body 43. As illustrated in FIG. 1, the parachute device 4 according to Embodiment 1 includes three ejection sections 41 for separately accommodating three flying bodies 43.

As illustrated in FIG. 3C, the ejection section 41 is formed in a tube shape. The ejection section 41 holds the flying body 43 at one end side and communicates with the gas introduction path 48 at the other end side.

The ejection section 41 is provided at the parachute accommodation section 40. Specifically, as illustrated in FIG. 3C and the like, each ejection section 41 is disposed at an outer circumferential surface 4010 of the side wall portion 401.

Here, the ejection section 41 is inclined, with respect to the central axis P of the parachute accommodation section 40, in a direction where an end portion in the ejection direction of the flying body 43 of the ejection section 41 (in the axis direction Q of the ejection section 41) is away from the central axis P of the parachute accommodation section 40.

Specifically, the central axis Q of each ejection section 41 (flying body holding section 411) is inclined in a direction where an ejection port 415 being an opening portion formed at the end portion of each of the flying body holding sections 411 opposite to a partition section 412 is away from the central axis P of the parachute accommodation section 40. For example, each ejection section 41 is disposed such that an angle formed by the central axis P of the parachute accommodation section 40 and the central axis Q of each ejection section 41 is an acute angle in a view from a direction perpendicular to the central axis P of the parachute accommodation section 40.

Further, a plurality of the ejection sections 41 is disposed at equal intervals in a rotational direction with the central axis P of the parachute accommodation section 40 being as a center. For example, when the parachute device 4 has three ejection sections 41, as illustrated in FIG. 3A and FIG. 3B, the respective ejection sections 41 are arranged at 120° (=360°/3) intervals in the rotational direction with the central axis P of the parachute accommodation section 40 being as a center.

As illustrated in FIG. 3C, the ejection section 41 includes the flying body holding section 411, for example, as a first tube-shaped member, formed in a cylindrical shape, an extrusion member housing section 413, for example, as a second tube-shaped portion, formed in a cylindrical shape, and the partition section 412 provided between the flying body holding section 411 and the extrusion member housing section 413.

The extrusion member housing section 413 movably houses the extrusion member 42. The extrusion member housing section 413 is formed in a cylindrical shape having the same outer diameter dimensions as those of the flying body holding section 411, for example. The extrusion member housing section 413 is disposed so as to be coaxial with the flying body holding section 411. The extrusion member housing section 413 is fixed to the partition section 412 at its one end, and is connected to the gas introduction path 48 at the other end via a connection member 44 to be described later.

The partition section 412 is provided between the flying body holding section 411 and the extrusion member housing section 413 and covers the respective end portions of the flying body holding section 411 and the extrusion member housing section 413 facing each other. The partition section 412 and the flying body holding section 411 define an accommodation space for accommodating the flying body 43. Additionally, the partition section 412 defines an accommodation space for accommodating the extrusion member 42, together with the extrusion member housing section 413.

A through hole 4120 for inserting the extrusion member 42 is formed in the partition section 412. As described below, the partition section 412 functions as a movement limiting section (stopper) configured to limit a range of movement of the extrusion member 42.

The flying body holding section 411, the partition section 412, and the extrusion member housing section 413 are formed of, for example, resin. The flying body holding section 411, the partition section 412, and the extrusion member housing section 413 may be integrally formed, for example, as a resin molded article, or may be formed as separated components and then joined to each other. In the present embodiment, it is assumed that the flying body holding section 411, the partition section 412, and the extrusion member housing section 413 are integrally molded as a component, and description will be given.

The flying body 43 is a device configured to discharge the parachute 400 to the outside of the parachute accommodation section 40 to assist the opening (deployment) of the parachute 400. The flying body 43 is configured of, for example, resin. The flying body 43 is formed, for example, in a bar shape. More specifically, as illustrated in FIG. 3C, the flying body 43 is formed in a partially hollow cylindrical shape, for example.

The flying body 43 is engaged with the ejection section 41 in a connected state with the parachute 400. Specifically, the flying body 43 is held in the ejection section 41 (flying body holding section 411) with its one end connected to the parachute 400 via the connection line 46 and with the other end being inserted inside the flying body holding section 411 and facing the partition section 412.

The extrusion member 42 is a component for extruding and ejecting the flying body 43 from the ejection section 41.

The extrusion member 42 is capable of being at least partially inserted into the interior of the ejection section 41 and moves in the extrusion member housing section 413 due to receiving the pressure of the gas introduced into the extrusion member housing section 413 to extrude the flying body 43 from the ejection section 41. In the present embodiment, the extrusion member 42 is housed in the extrusion member housing section 413, for example.

The extrusion member 42 is configured of, for example, resin, metal (stainless steel, or the like), or the like. The extrusion member 42 is formed in a bar shape and extends in the ejection section 41 (the extrusion member housing section 413) along the axis Q of the ejection section 41. For example, the extrusion member 42 includes a bar-shaped portion 421 configured to contact the flying body 43 to apply a force to the flying body 43 in the direction of the axis Q of the ejection section 41, and a pressure receiving section 422 provided at one end of the bar-shaped portion 421 and configured to receive pressure of gas generated by the gas generating device 60.

The bar-shaped portion 421 is formed, for example, in a cylindrical shape, and has an outer diameter being smaller than an inner diameter of the extrusion member housing section 413.

The pressure receiving section 422 is formed, for example, in a cylindrical shape, and is connected to the bar-shaped portion 421 so as to be coaxial with each other. The pressure receiving section 422 has an outer diameter being larger than the outer diameter of the bar-shaped portion 421. For example, the pressure receiving section 422 has an outer diameter capable of sliding on an inner wall surface of the extrusion member housing section 413.

Note that a sealing device (packing) 423 may be provided at an outer circumferential surface of the pressure receiving section 422 in order to prevent gas introduced from the gas introduction path 48 into the extrusion member housing section 413 from leaking to the flying body holding section 411 side.

The extrusion member 42 is housed in the extrusion member housing section 413 such that the pressure receiving section 422 is disposed at the connection member 44 side and the bar-shaped portion 421 is disposed at the flying body 43 side. As illustrated in FIG. 3C, in a state before ejection of the flying body 43, for example, a part of the bar-shaped portion 421 is inserted through the through hole 4120 of the partition section 412.

Here, the through hole 4120 is formed such that the bar-shaped portion 421 can be inserted and the pressure receiving section 422 cannot be inserted. For example, the diameter of the through hole 4120 is larger than the outer diameter of the bar-shaped portion 421, and is smaller than the outer diameter of the pressure receiving section 422. As a result, the partition section 412 of the ejection section 41 functions as the movement limiting section (stopper) configured to limit the range of the movement of the extrusion member 42 in the ejection section 41.

The gas generating device 60 is a device configured to generate gas serving as a base of a thrust force for ejecting the flying body 43 from the ejection port 415 of the ejection section 41. The gas generating device 60 is fixed at the outer circumferential surface of the bottom portion 402 of the parachute accommodation section 40, for example. For example, as illustrated in FIG. 3B and FIG. 3C, the gas generating device 60 is fixed at the outer circumferential surface of the bottom portion 402 of the parachute accommodation section 40 such that the central axis P of the parachute accommodation section 40 and the central axis of the gas generating device 60 coincide with each other.

As illustrated in FIG. 3C, the gas generating device 60 includes a housing 600, a gas generating agent 601, an ignition agent 602, and a sealing member 603.

The housing 600 is a case including a gas discharge chamber 604 configured to hold the gas generating agent 601 and to discharge gas generated from the gas generating agent 601. For example, the housing 600 has a dome shape. The housing 600 is configured of, for example, resin. Preferably, the housing 600 is configured of fiber-reinforced plastics (FRP) or the like. Note that the housing 600 is not limited to being made of resin, and may be configured of metal.

The gas generating agent 601 is disposed in the gas discharge chamber 604 with a part of the surface covered by the sealing member 603. When gas is generated from the gas generating agent 601, the sealing member 603 is configured of a material to be easily destroyed by pressure of the generated gas. The sealing member 603 is, for example, a thin film such as polyester.

The ignition agent 602 is a chemical agent for igniting the gas generating agent 601. The ignition agent 602 is formed at one end of the lead wire 47. For example, the ignition agent 602 can be fixed at one end of the lead wire 47 by applying and solidifying a liquid ignition agent mixed with resin or the like into a tip end of the lead wire 47.

The ignition agent 602 is fixed, for example, in the housing 600 with a part of the ignition agent 602 being in contact with the gas generating agent 601 (for example, with at least a part of the ignition agent 602 embedded in the gas generating agent 601). A method of fixing the ignition agent 602 is, for example, as follows.

First, the lead wire 47 formed with the ignition agent 602 at the tip end is embedded into the gas discharge chamber 604 of the housing 600. After that, the gas generating agent 601 formed in a powdery state and mixed with resin or the like is poured into the gas generating chamber 604 of the housing 600, and then is subject to pressed loading. As a result, the ignition agent 602 is fixed inside the gas generating agent 601.

The ignition agent 602 is electrically connected to the ejection control section 45 through the lead wire 47. The ignition agent 602 is ignited in response to an ignition signal output from the ejection control section 45 to generate gas by causing the gas generating agent 601 to chemically react.

The gas discharge port 605 for discharging gas generated in the gas discharge chamber 604 to the outside is formed in the housing 600. The gas discharge port 605 is formed corresponding to each ejection section 41. In the present embodiment, the three ejection sections 41 are provided, and thus, three gas discharge ports 605 are formed in the housing 600. The gas discharge port 605 is in communication with the gas introduction path 48 via the connection member 44.

The gas introduction path 48 is a tube for introducing the gas generated from the gas generating device 60 to the ejection section 41. For example, the gas introduction path 48 is a tube-shaped member made of a resin material having a heat resistance property or a metal material (stainless steel, or the like). The gas introduction path 48 extends from the gas discharge port 605 of the gas generating device 60 to the extrusion member housing section 413 of the ejection section 41, along the bottom portion 402 and the outer circumferential surface of the side wall portion 401, of the parachute accommodation section 40.

The connection member 44 is a component for causing the gas introduction path 48, the gas generating device 60, and the extrusion member housing section 413 to communicate with one another in a sealed state. The connection member 44 is formed of a resin material having a heat resistance property or a metal material (stainless steel, or the like), for example. For example, one end portion of the gas introduction path 48 is connected in a sealed state with an end portion of the extrusion member housing section 413 by using one connection member 44. Further, the other end portion of the gas introduction path 48 is connected in a sealed state with the gas discharge port 605 of the gas generating device 60 by using another connection member 44. As a result, the gas discharge chamber 604 of the gas generating device 60 and the interior of the extrusion member housing section 413 of the ejection section 41 communicate with each other through the gas introduction path 48, and the gas generated from the gas generating device 60 is introduced to the interior of the extrusion member housing section 413 without leaking.

Next, a procedure of the opening of the parachute 400 in the parachute device 4 according to Embodiment 1 will now be described.

Figure 5:
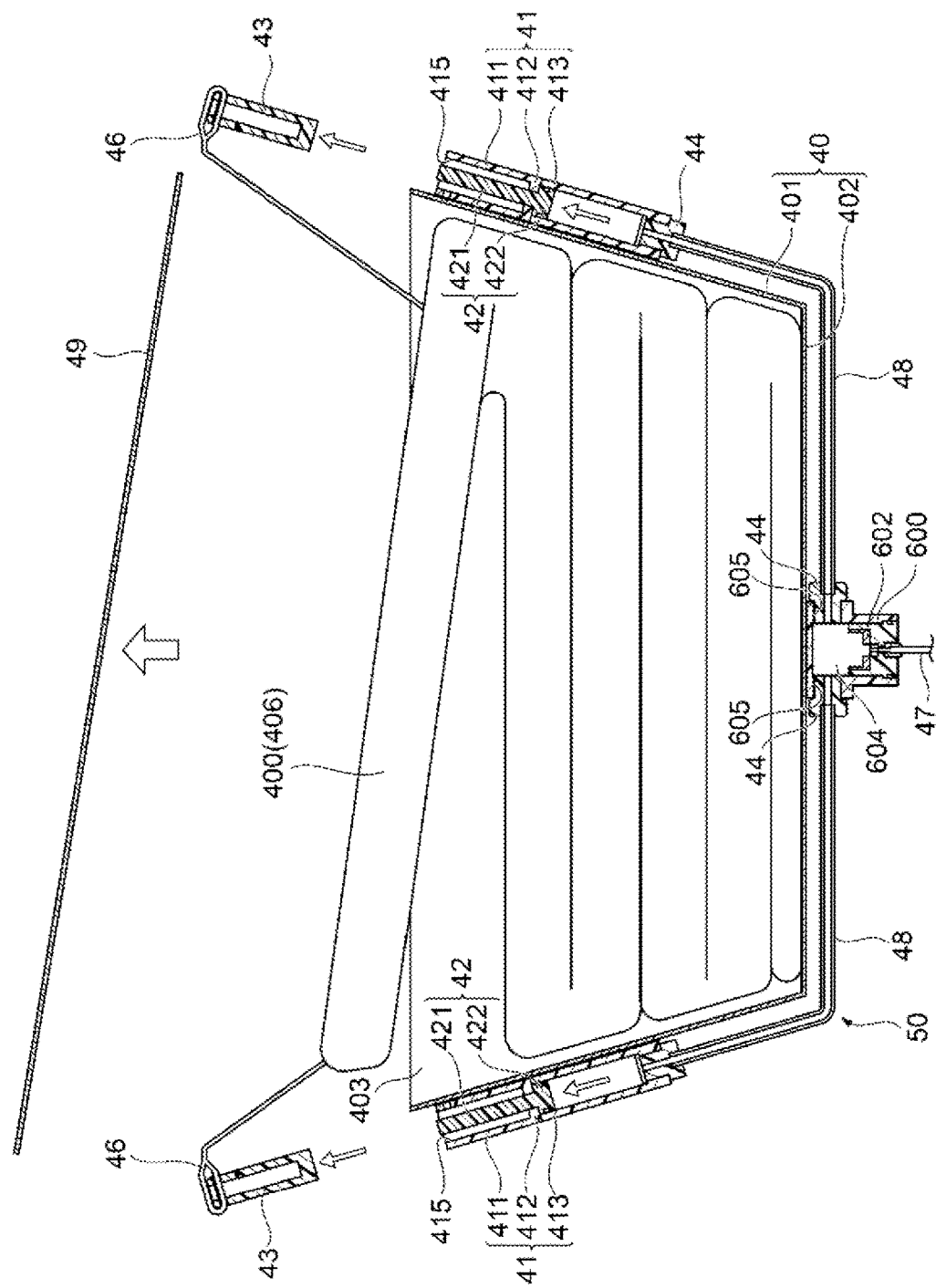
FIG. 5 is a diagram schematically illustrating a state after ejection of flying bodies of the parachute device according to Embodiment 1.

FIG. 5 is a diagram schematically illustrating a state after ejection of the flying bodies 43 of the parachute device 4 according to Embodiment 1. Similarly to FIG. 3C, a side cross section (partial cross section) of the parachute device 4 after ejection of the flying bodies 43 is illustrated in the same figure.

For example, during flying of the flight device 1 equipped with the parachute device 4, when a state with the inclination of the aircraft body (the aircraft body unit 2) of the flight device 1 exceeds the inclination threshold value 29 for a predetermined period of time because of strong wind, and the abnormality detection section 15 determines that it is in the abnormal state, the fall control section 16 at the flight device 1 side transmits a control signal indicating the opening of the parachute 400 to the ejection control section 45 of the parachute device 4.

The ejection control section 45 outputs an ignition signal to the gas generating device 60 through the lead wire 47 when the control signal indicating the opening of the parachute 400 is received. Specifically, the ejection control section 45 causes a predetermined current to flow through the lead wire 47 to ignite the ignition agent 602 formed at one end of the lead wire 47.

Due to the ignition of the ignition agent 602, the gas generating agent 601 being in contact with the ignition agent 602 chemically reacts to generate gas. As the pressure of the gas increases, the gas breaks through the sealing member 603 and fills in the gas discharge chamber 604. Thereafter, the gas in the gas discharge chamber 604 is discharged from each gas discharge port 605 through the gas introduction path 48 into the extrusion member housing section 413 of each ejection section 41. When the pressure receiving section 422 of the extrusion member 42 receives the pressure of the gas, the extrusion member 42 vigorously moves along the axis of the extrusion member housing section 413 in the extrusion member housing section 413 to extrude and eject the flying body 43 from the ejection port 415 of the ejection section 41 by the bar-shaped portion 421.

Regarding the extrusion member 42 having moved toward the ejection port 415, the movement of the extrusion member 42 is limited in the extrusion member housing section 413, because the pressure receiving section 422 contacts the partition section 412 in the ejection section 41. This allows the through hole 4120 of the partition section 412 to be blocked by the pressure receiving section 422 and the sealing device 423, and it is possible to prevent high-temperature gas discharged into the extrusion member housing section 413 from leaking into the flying body holding section 411. That is, high-temperature gas can be prevented from being vigorously discharged from the ejection port 415 of the ejection section 41 when the flying body 43 is ejected.

Note that a through hole may be formed in the extrusion member housing section 413 so that the gas accumulated in the extrusion member housing section 413 is gradually discharged to the outside. This through hole needs to be formed so as not to affect the generation of gas pressure sufficient to eject the flying body 43 by the extrusion member 42.

As illustrated in FIG. 5, when the respective flying bodies 43 are ejected from the corresponding ejection sections 41, each of the flying bodies 43 pulls the parachute 400 (parachute body 406) through the connection line 46. This causes the parachute 400 to be discharged from the parachute accommodation section 40. After that, the parachute 400 further pulled by each flying body 43 is opened by the air entering in the interior of the parachute body 406 in the folded state.

Figure 6:
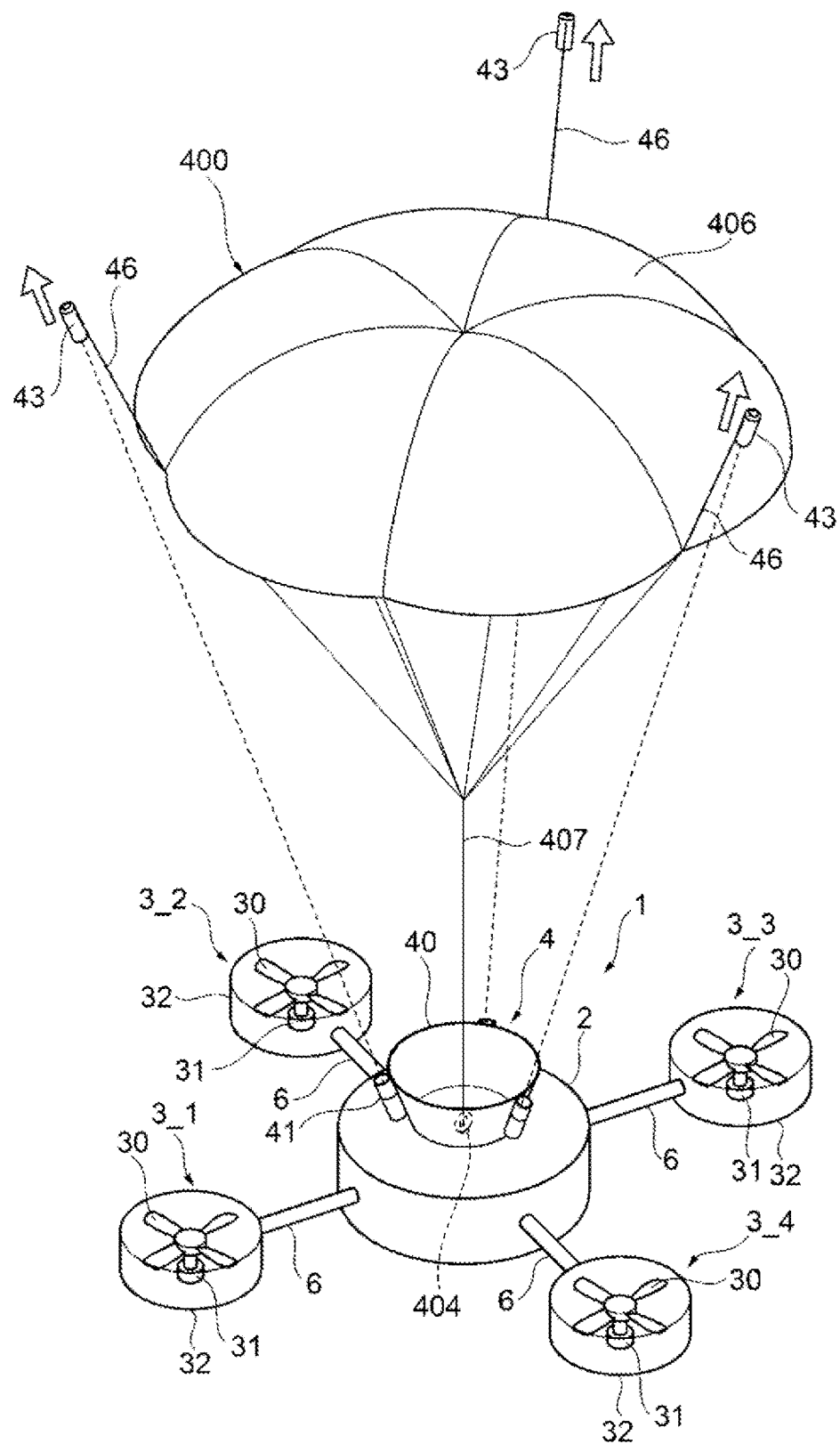
FIG. 6 is a diagram schematically illustrating a state with the parachute of the flight device according to Embodiment 1 being opened.

FIG. 6 is a diagram schematically illustrating a state with the parachute 400 of the flight device 1 according to Embodiment 1 being opened.

For example, when each flying body 43 is ejected through the processing procedure described above, each flying body 43 flies out in the axial direction of the central axis Q of the ejection section 41. That is, each flying body 43 flies in a direction away from the central axis P of the parachute accommodation section 40. This allows each flying body 43 to effectively pull the parachute body 406 of the discharged parachute 400 from its apex portion to the edge (peripheral edge) side as compared to a case of ejecting each flying body 43 straight up (in a direction parallel to the central axis P of the parachute accommodation section 40). As a result, the parachute body 406 can be quickly spread and can be easily filled with the air.

As described above, the parachute device 4 according to Embodiment 1 includes the parachute accommodation section 40 configured to accommodate the parachute 400, at least one flying body 43 connected to the parachute 400, the ejection section 41 configured to hold the flying body 43 and to eject the held flying body 43 and having a tube shape, the gas generating device 60 configured to generate gas, and the extrusion member 42 configured to extrude the flying body 43 from the ejection section 41 due to receiving pressure of the gas generated from the gas generating device 60.

In this way, the flying body 43 is extruded and ejected from the ejection section 41 by receiving pressure from the extrusion member 42 having received the high-temperature gas, rather than by directly receiving the pressure of the high-temperature gas generated by the gas generating device 60, and thus, damage of the parachute 400 due to vigorous discharge of high-temperature gas from the ejection section 41 together with the flying body 43 can be prevented. This can increase the reliability of the parachute device 4.

In particular, by further providing a movement limiting section (for example, the partition section 412 of the ejection section 41) configured to limit a range of movement of the extrusion member 42 in the parachute device 4, the extrusion member 42 having moved by the pressure of the gas can be stopped by causing the extrusion member 42 to be brought into contact with the partition section 412 of the ejection section 41 serving as the movement limiting section. This can reliably prevent the extrusion member 42 from being ejected from the ejection port 415 when the flying body 43 is ejected, and high-temperature gas can be effectively prevented from being vigorously ejected from the ejection port 415.

Further, in the parachute device 4 according to Embodiment 1, the gas generating device 60 includes the housing 600 including the gas discharge chamber 604 configured to house the gas generating agent 601 and to discharge gas generated from the gas generating agent 601. The ejection section 41 accommodating the extrusion member 42 holds the flying body 43 at one end side and communicates with the gas discharge chamber 604 at the other end side through the gas introduction path 48.

According to this configuration, the extrusion member 42 disposed in the ejection section 41 can be disposed such that the gas generating device 60 and the ejection section 41 holding the flying body 43 are spaced apart from each other.

Also, in the parachute device 4, the ejection section 41 includes the flying body holding section 411 serving as a first tube-shaped member and configured to hold the flying body 43, the extrusion member housing section 413 serving as a second tube-shaped portion and disposed so as to be coaxial with the flying body holding section 411, the partition section 412 provided between the flying body holding section 411 and the extrusion member housing section 413, covering the respective end portions of the flying body holding section 411 and the extrusion member housing section 413 facing each other, and formed with the through hole 4120. The extrusion member 42 includes the bar-shaped portion 421 and the pressure receiving section 422 fixed to one end of the bar-shaped portion 421 and configured to receive pressure of gas. The through hole 4120 provided at the partition section 412 is formed so as to be capable of being inserted with the bar-shaped portion 421 but so as not to be capable of being inserted with the pressure receiving section 422.

According to this configuration, gas generated from the gas generating device 60 is introduced into the extrusion member housing section 413, and after the extrusion member 42 has moved in the extrusion member housing section 413, the pressure receiving section 422 contacts the partition section 412, and the movement of the extrusion member 42 is stopped. At this time, since the through hole 4120 of the partition section 412 is blocked by the pressure receiving section 422 and the sealing device 423, it is possible to prevent gas from leaking into the flying body holding section 411 from an interior of the extrusion member housing section 413. This can more effectively prevent high-temperature gas from being discharged from the ejection section 41 and directly touching the parachute 400.

Embodiment 2

Figure 7A:
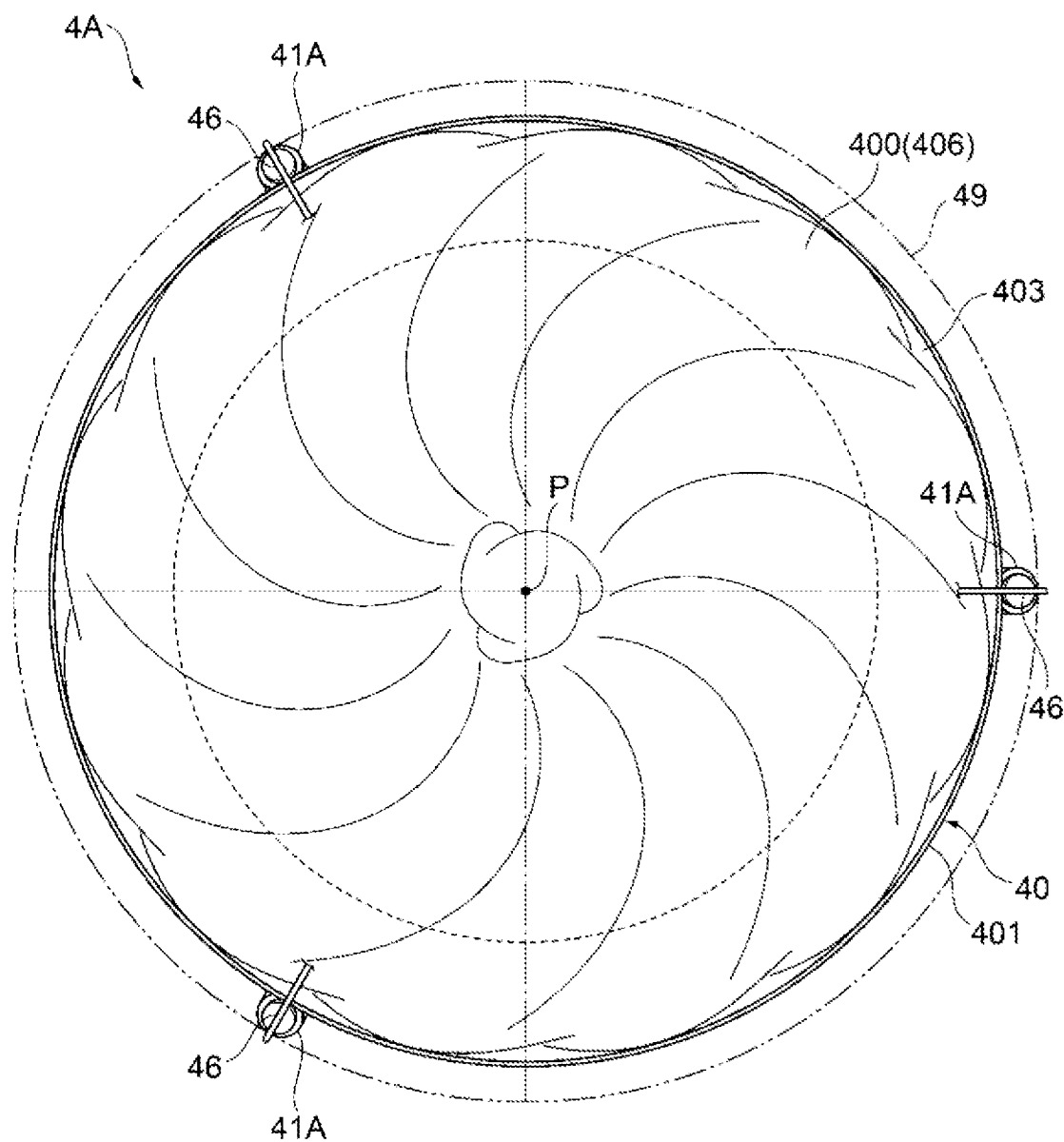
FIG. 7A is a diagram schematically illustrating a configuration of a parachute device according to Embodiment 2.
Figure 7B:
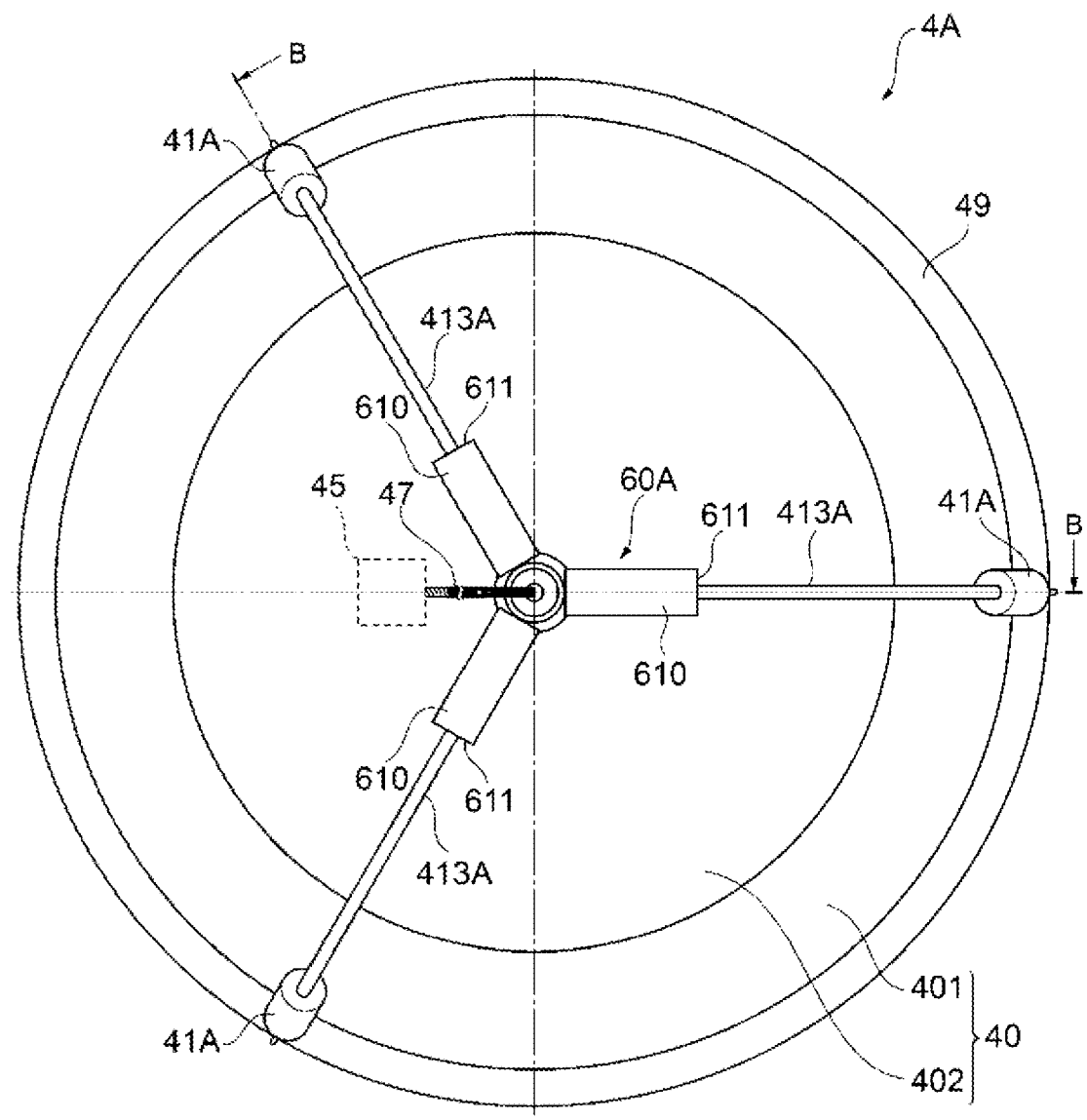
FIG. 7B is a diagram schematically illustrating the configuration of the parachute device according to Embodiment 2.
Figure 7C:
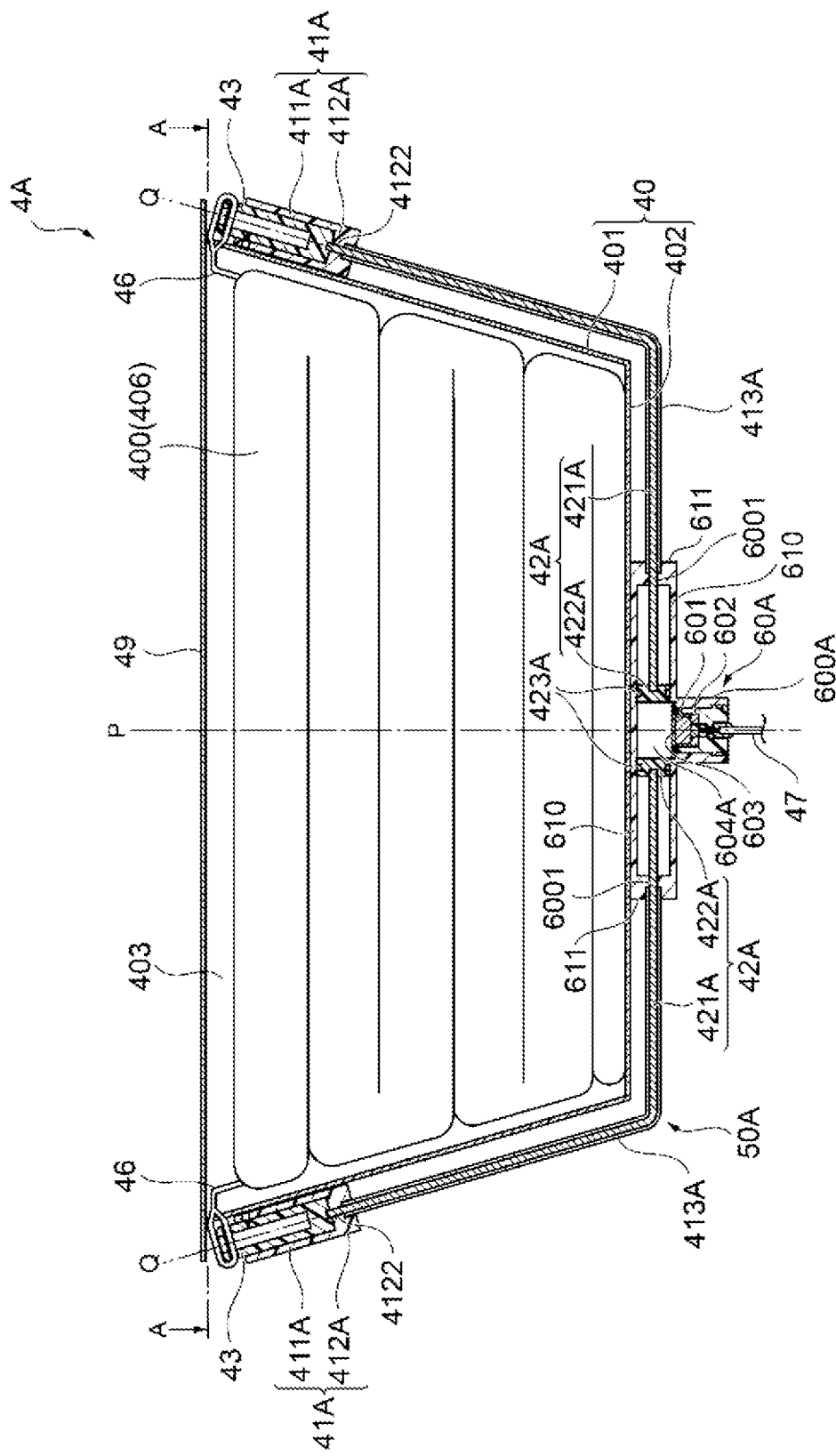
FIG. 7C is a diagram schematically illustrating the configuration of the parachute device according to Embodiment 2.

FIG. 7A to FIG. 7C are diagrams schematically illustrating a configuration of a parachute device 4A according to Embodiment 2. A top view (an A-A plane in FIG. 7C) of the parachute device 4A is illustrated in FIG. 7A, a bottom view of the parachute device 4A is illustrated in FIG. 7B, and a side cross section (a B-B partial cross section in FIG. 7B) of the parachute device 4A before ejection of the flying body 43 is illustrated in FIG. 7C.

The parachute device 4A according to Embodiment 2 illustrated in FIG. 7A to FIG. 7C differs from the parachute device 4 according to Embodiment 1 in that the parachute device 4A has a structure that gas generated from the gas generating device is not sent to the ejection section, but is similar to the parachute device 4 according to Embodiment 1 in other respects.

Specifically, a flying body ejection mechanism 50A according to Embodiment 2 includes the flying bodies 43, ejection sections 41A, extrusion members 42A, extrusion member housing sections 413A, and a gas generating device 60A.

Similarly to Embodiment 1, the ejection section 41A is a device configured to hold the flying body 43 to eject the held flying body 43, and is provided for each flying body 43.

As illustrated in FIG. 7C, the ejection section 41A is formed in a tube shape having an opening at one end and having a bottom at the other end. The ejection section 41A holds the flying body 43, and is connected to the extrusion member housing section 413A.

As illustrated in FIG. 7C, the ejection section 41A includes a flying body holding section 411A formed in a tube shape (for example, a cylindrical shape), and a bottom portion 412A covering one end portion of the flying body holding section 411A. The flying body holding section 411A and the bottom portion 412A are formed of, for example, resin. Here, the flying body holding section 411A, and the bottom portion 412A may be integrally formed, for example, as a resin molded article, or may be formed as separated components and joined to each other. In the present embodiment, the flying body holding section 411A and the bottom portion 412A will be described as an integrally molded component.

The bottom portion 412A defines an accommodation space for accommodating the flying body 43, together with the flying body holding section 411A. The bottom portion 412A is configured to allow the extrusion member 42A to be inserted. Specifically, as illustrated in FIG. 7C, the through hole 4122 holding one end of the extrusion member housing section 413A and allowing one end of the extrusion member 42A (one end of the bar-shaped portion 421A to be described below) housed in the extrusion member housing section 413A to be inserted is formed in the bottom portion 412A.

The flying body 43 is held by the ejection section 41A with one end portion connected to the parachute 400 through the connection line 46 and with the other end portion inserted inside the flying body holding section 411A and facing the bottom portion 412A.

The gas generating device 60A is a device configured to generate gas serving as a base of a thrust force for ejecting the flying body 43 from the ejection port 415 of the ejection section 41A. Similarly to the gas generating device 60 according to Embodiment 1, the gas generating device 60A is fixed, for example, at the outer circumferential surface of the bottom portion 402 of the parachute accommodation section 40.

As illustrated in FIG. 7C, the gas generating device 60A includes a housing 600A, the gas generating agent 601, the ignition agent 602, and the sealing member 603.

The housing 600A is a case including a gas discharge chamber 604A configured to hold the gas generating agent 601 and to discharge gas generated from the gas generating agent 601. The housing 600A is configured of, for example, similarly to the housing 600 according to Embodiment 1, fiber-reinforced plastics (FRP) or the like.

As illustrated in FIG. 7B and FIG. 7C, the housing 600A includes tube-shaped portions 610 and each portion has a bottom at one end. The tube-shaped portion 610 is provided corresponding to each ejection section 41A, and defines the gas discharge chamber 604A by its internal space. The tube-shaped portions 610 are disposed in the housing 600A so as to protrude radially from a center portion where the gas generating agent 601 is disposed toward each ejection section 41A. A part of the extrusion member 42A is housed in the gas discharge chamber 604A defined by the respective tube-shaped portions 610.

A through hole 6001 capable of being inserted with a part of the extrusion member 42A is formed in the bottom portion 611 of each tube-shaped portion 610 (the end portion of each tube-shaped portion 610 at the opposite side to the center portion described above).

The extrusion member 42A is a component for extruding and ejecting the flying body 43 from the ejection section 41A. At least a part of the extrusion member 42A can be inserted into the ejection section 41A. The extrusion member 42A receives the pressure of the gas generated from the gas generating device 60A, and the flying body 43 is extruded from the ejection section 41A.

The extrusion member 42A is formed in a bar shape. The extrusion member 42A is provided for each ejection section 41A (flying body 43), and extends between the corresponding tube-shaped portion 610 and ejection section 41A.

The extrusion member 42A can be inserted into the ejection section 41A at one end side, and is housed in the tube-shaped portion 610 at the other end. Specifically, the extrusion member 42A includes a bar-shaped portion 421A capable of being inserted into the ejection section 41A, and a pressure receiving section 422A fixed to the other end side of the bar-shaped portion 421A, disposed inside the tube-shaped portion 610 (gas discharge chamber 604A), and configured to receive the pressure of the gas.

The bar-shaped portion 421A is formed, for example, in a cylindrical shape. The bar-shaped portion 421A is configured of a material having flexibility (for example, resin, spring steel, or the like).

The pressure receiving section 422A is formed, for example, in a cylindrical shape, and is connected to the bar-shaped portion 421A so as to be coaxial with each other. The pressure receiving section 422A is integrally formed with the bar-shaped portion 421A by using the same material, for example.

The pressure receiving section 422A has an outer diameter being larger than an outer diameter of the bar-shaped portion 421A. For example, the pressure receiving section 422A has the outer diameter capable of sliding on an inner wall surface of the tube-shaped portion 610 of the housing 600A.

Note that a sealing device (packing) 423A may be provided on an outer circumferential surface of the pressure receiving section 422A in order to prevent gas discharged into the gas discharge chamber 604A from leaking into the extrusion member housing section 413A to be described below.

The pressure receiving section 422A of the extrusion member 42A is disposed in the corresponding tube-shaped portion 610. A part of the bar-shaped portion 421A of the extrusion member 42A is disposed in the ejection section 41A. For example, as illustrated in FIG. 7C, in a state before ejection of the flying body 43, the bar-shaped portion 421A is inserted, at one end side, through the through hole 4122 of the bottom portion 412A of the ejection section 41A, and the bar-shaped portion 421A is inserted, at the other end side, through the through hole 6001 formed in the bottom portion 611 of the tube-shaped portion 610.

Here, the through hole 6001 is formed such that the bar-shaped portion 421A can be inserted and the pressure receiving section 422A cannot be inserted. For example, a diameter of the through hole 6001 is larger than the outer diameter of the bar-shaped portion 421A, and is smaller than the outer diameter of the pressure receiving section 422A. As a result, the bottom portion 611 of the housing 600A functions as a movement limiting section (stopper) configured to limit a range of movement of the extrusion member 42A in the tube-shaped portion 610 (gas discharge chamber 604A) of the housing 600A.

The extrusion member housing section 413A is a tube-shaped member disposed between each ejection section 41A and the gas generating device 60A and configured to movably house the bar-shaped portion 421A. The extrusion member housing section 413A is configured of, for example, resin, metal, or the like. The extrusion member housing section 413A is connected, at one end, to the bottom portion 412A of the ejection section 41A, and is connected, at the other end, to the bottom portion 611 of the tube-shaped portion 610 in the housing 600A. The extrusion member housing section 413A houses the bar-shaped portion 421A of the extrusion member 42A, and guides the movement of the bar-shaped portion 421A.

Next, a procedure of opening the parachute 400 in the parachute device 4A according to Embodiment 2 will be described.

Figure 8:
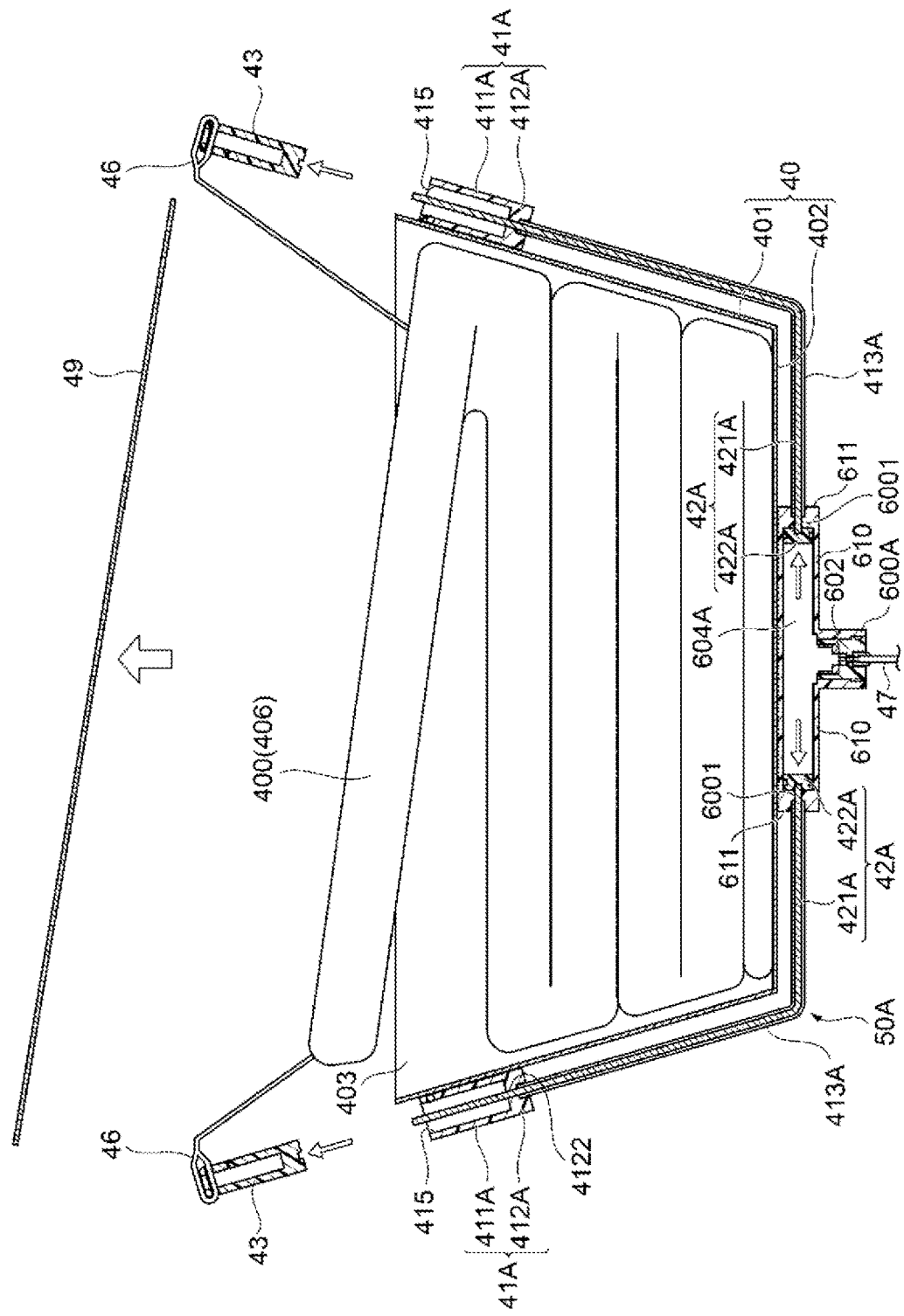
FIG. 8 is a diagram schematically illustrating a state after ejection of flying bodies of the parachute device according to Embodiment 2.

FIG. 8 is a diagram schematically illustrating a state after ejection of the flying bodies 43 of the parachute device 4A according to Embodiment 2. A side cross section (partial cross section) of the parachute device 4A before ejection of the flying bodies 43 is illustrated in the same figure.

For example, similarly to the parachute device 4 according to Embodiment 1, when the parachute device 4A according to Embodiment 2 receives a control signal for indicating opening of the parachute 400, the parachute device 4A outputs an ignition signal to the gas generating device 60A through the lead wire 47 to generate gas in the gas discharge chamber 604A of the gas generating device 60A. When the pressure of the gas in the gas discharge chamber 604A exceeds the predetermined value, the pressure receiving section 422A of each extrusion member 42A receives the pressure of the gas and vigorously moves in the gas discharge chamber 604A (tube-shaped portion 610). As a result, the bar-shaped portion 421A connected to the pressure receiving section 422A moves in the extrusion member housing section 413A, and a tip portion of the bar-shaped portion 421A at the opposite side to the pressure receiving section 422A extrudes and ejects the flying body 43 from the ejection port 415.

The extrusion member 42A having moved stops because its pressure receiving section 422A contacts the bottom portion 611 of each tube-shaped portion 610 of the housing 600A. At this time, the through hole 6001 of the housing 600A is blocked by the pressure receiving section 422A of the extrusion member 42A and the sealing device 423A, it is possible to prevent high-temperature gas from leaking into the extrusion member housing section 413A from the through hole 6001 of the tube-shaped portion 610. That is, high-temperature gas can be prevented from being vigorously discharged from the ejection port 415 through the extrusion member housing section 413A when the flying body 43 is ejected.

Note that a hole may be formed in the tube-shaped portion 610 so that the gas accumulated in each gas discharge chamber 604A is gradually discharged to the outside. This hole is preferably formed to have such a size that the generation of gas pressure sufficient to eject the flying body 43 is not affected by the extrusion member 42A.

As illustrated in FIG. 8, when each flying body 43 is ejected from the corresponding ejection section 41A, each flying body 43 pulls the parachute 400 (parachute body 406) through the corresponding connection line 46. This causes the parachute 400 to be ejected from the parachute accommodation section 40 and to be opened, similarly to the parachute device 4 according to Embodiment 1.

As described above, in the parachute device 4A according to Embodiment 2, the extrusion member 42A extends between each gas discharge chamber 604A of the gas generating device 60A and each ejection section 41A. The extrusion member 42A is housed in the gas discharge chamber 604A at one end side, and the extrusion member 42A can be inserted into the ejection section 41A at the other end side.

According to this configuration, the extrusion members 42A can be driven without causing the gas generated in the gas generating device 60A to branch up to the respective ejection sections 41A to be discharged. That is, according to the parachute device 4A, since the high-temperature gas is not sent to each ejection section 41A, it is possible to more reliably prevent high-temperature gas from being discharged from the ejection port 415 of the ejection section 41A when the flying body 43 is ejected.

In addition, in the parachute device 4A, the extrusion member 42A includes the bar-shaped portion 421A capable of being inserted into the ejection section at one end side, and the pressure receiving section 422A fixed to the other end side of the bar-shaped portion 421A, disposed inside the gas discharge chamber 604A, and configured to receive the pressure of gas. The housing 600A defines the gas discharge chamber 604A, and includes the tube-shaped portion 610 configured to movably house the pressure receiving section 422A. The through hole 6001 capable of being inserted with the bar-shaped portion 421A and not capable of being inserted with the pressure receiving section 422A is formed in the tube-shaped portion 610.

According to this configuration, the extrusion member 42A having moved by receiving the pressure of gas stops because the pressure receiving section 422A contacts the tube-shaped portion 610 (bottom portion 611) of the housing 600A. This can more effectively prevent high-temperature gas from directly touching the parachute 400 as described above because of blocking by the pressure receiving section 422A of the extrusion member 42A and the sealing device 423A.

Expansion of Embodiment

The invention conceived by the present inventors has been described in detail above with reference to the embodiments. However, the present invention is not limited to the embodiments, and of course, various modifications can be made without departing from the gist of the present invention.

For example, in the embodiments described above, the examples have been given that the ejection control section 45 is provided in the parachute device 4, 4A, but the present invention is not limited to this. For example, the ejection control section 45 may be provided in the aircraft body unit 2.

In the embodiments described above, a case of the parachute accommodation section 40 having a cylindrical shape has been exemplified, but the present invention is not limited to this. That is, it is sufficient that the parachute accommodation section 40 has a space for accommodating the parachute 400 in the interior, and the parachute accommodation section 40 may be formed, for example, in a hollow polygonal column (for example, quadrangular prism) shape.

In addition, in the embodiments described above, the examples have been given that the outer shape of the ejection section 41, 41A is cylindrical, but the present invention is not limited to this. That is, the ejection section 41, 41A may have a structure accommodating the flying body 43 in the interior, and being capable of ejecting the flying body 43, for example, the outer shape may be a polygonal column (for example, quadrangular prism) shape, and the internal space accommodating the flying body 43 may be cylindrical.

REFERENCE SIGNS LIST

1 Flight device
2 Aircraft body unit
3, 3_1 to 3_$n$ Thrust force generation section
4, 4A Parachute device
5 Notification device
6 Arm section
9 External device
11 Power supply section
12 Sensor section
13, 13_1 to 13_$n$ Motor drive section
14 Flight control section
15 Abnormality detection section
16 Fall control section
17 Communication section
18 Storage section
22 Battery
23 Power supply circuit
24 Angular velocity sensor
25 Acceleration sensor
26 Magnetic sensor
27 Angle calculation section
28 Remaining capacity threshold value
29 Inclination threshold value
30 Propeller
31 Motor
32 Case
40 Parachute accommodation section
41, 41A Ejection section 42, 42A Extrusion member
43 Flying body
44 Connection member
45 Ejection control section
46 Connection line
47 Lead wire (conductive wire)
48 Gas introduction path
49 Cover member
50, 50A Flying body ejection mechanism
60, 60A Gas generating device
400 Parachute
401 Side wall portion
402 Bottom portion
403 Accommodation space
404 Parachute attachment section
406 Parachute body (canopy)
407 Hanging line
411, 411A Flying body holding section
412 Partition section
412A Bottom portion
413, 413A Extrusion member housing section
415 Ejection port
421, 421A Bar-shaped portion
422, 422A Pressure receiving section
423, 423A Sealing device (packing)
600, 600A Housing
601 Gas generating agent
602 Ignition agent
603 Sealing member
604, 604A Gas discharge chamber
605 Gas discharge port
610 Tube-shaped portion
611 Bottom portion
4010 Outer circumferential surface
4120, 4122, 6001 Through hole
O Central portion
P Central axis
Q Axis

The invention claimed is:

1. A parachute device comprising:
a parachute;
a parachute accommodation section configured to accommodate the parachute;
a passive flying body connected to the parachute;
an ejection section having a tube shape and configured to hold the flying body and to eject the flying body held therein;
a gas generating device configured to generate gas to produce a thrust force;
an extrusion member capable of being at least partially inserted into the ejection section, the extrusion member being configured to extrude the flying body from the ejection section due to receiving the thrust force produced by pressure of the gas generated from the gas generating; and
a movement limiting section configured to limit a range of movement of the extrusion member, wherein
the parachute accommodation section includes:
a side wall portion being continuous in a circumferential direction and having a tube shape which defines an entirety of one end of the parachute accommodation section, and
a bottom portion formed to block an opening at the one end of the side wall portion,
the parachute is disposed in an accommodation space defined by the side wall portion and the bottom portion, and
the ejection section is disposed at an outer circumferential surface of the side wall portion.

2. The parachute device according to claim 1, further comprising:
a gas introduction path configured to introduce the gas generated from the gas generating device to the ejection section, wherein
the gas generating device includes:
a gas generating agent configured to generate the gas, and
a housing configured to house the gas generating agent and including a gas discharge chamber configured to discharge the gas generated from the gas generating agent,
the ejection section defining one end and an opposite other end, the ejection section is configured to hold the flying body at the one end and communicates with the gas discharge chamber through the gas introduction path at the other end,
the extrusion member is accommodated at least partially within the ejection section, and
the movement limiting section limits the range of the movement of the extrusion member within the ejection section.

3. The parachute device according to claim 2, wherein
the ejection section includes:
a first tube-shaped member,
a second tube-shaped member disposed so as to be coaxial with the first tube-shaped member, and
a partition section provided between the first tube-shaped member and the second tube-shaped member, the partition section covering respective end portions of the first tube-shaped member and the second tube-shaped member facing each other, the partition section serving as the movement limiting section,
the flying body is provided at the first tube-shaped member,
the extrusion member includes a bar-shaped portion and a pressure receiving section comprising a cylindrical body, the pressure receiving section being fixed to one end of the bar-shaped portion and configured to receive thrust force produced by the pressure of the gas, and
the partition section is formed with a through hole whereby the bar-shaped portion can pass freely through the through hole, but the pressure receiving section cannot pass through the through hole.

4. The parachute device according to claim 1, wherein
the gas generating device includes:
a gas generating agent configured to generate the gas, and
a housing configured to house the gas generating agent and including a gas discharge chamber configured to discharge the gas generated from the gas generating agent,
the extrusion member extends between the gas discharge chamber and the ejection section, and
the extrusion member includes:
a bar-shaped portion extending between one end and an opposite other end, the bar-shaped portion capable of being inserted into the ejection section at the one end, and
a pressure receiving section comprising a cylindrical body fixed to the other end of the bar-shaped portion and disposed in the gas discharge chamber, the pressure receiving section being configured to receive the thrust force produced by the pressure of the gas, and
a bottom portion of the housing defines the movement limiting section whereby the pressure receiving section cannot pass to limit the range of the movement of the extrusion member in the gas discharge chamber.

5. The parachute device according to claim 4, wherein
the housing includes a tube-shaped portion defining the gas discharge chamber and configured to house the pressure receiving section movably therein, and
the tube-shaped portion is formed with a through hole whereby the bar-shaped portion can pass freely through the through hole but the pressure receiving section cannot pass through the through hole.

6. A flight device comprising:
an aircraft body unit;
a flight thrust force generation section connected to the aircraft body unit and configured to generate a flight thrust force;
a flight control section configured to control the flight thrust force generation section;
an abnormality detection section configured to detect an abnormality during flying;
the parachute device according to claim 1; and
a fall control section configured to cause the flying body to be ejected from the ejection section in response to detection of the abnormality by the abnormality detection section.

7. A parachute device comprising:
a parachute;
a parachute accommodation section configured to accommodate the parachute;
a plurality of passive flying bodies connected to the parachute;
a plurality of ejection sections, one ejection section provided for each of the flying bodies, each ejection section being configured to hold the corresponding flying body and to eject the flying body held therein;
one gas generating device configured to generate gas to produce a thrust force;
an extrusion member provided for each of the ejection sections, the extrusion member being capable of being at least partially inserted into the corresponding ejection section, the extrusion member being configured to extrude the flying body from the ejection section due to receiving pressure of the gas generated from the gas generating device; and
a movement limiting section provided for each of the extrusion members and configured to limit a range of movement of the corresponding extrusion member, wherein
the parachute accommodation section includes:
a side wall portion being continuous in a circumferential direction and which defines an entirety of one end of the parachute accommodation section, and
a bottom portion formed to block an opening at the one end of the side wall portion, and
the parachute is disposed in an accommodation space defined by the side wall portion and the bottom portion.

8. The parachute device according to claim 7, further comprising:
a gas introduction path configured to introduce the gas generated from the gas generating device to each of the ejection sections, wherein
the gas generating device includes:
a gas generating agent configured to generate the gas, and
a housing configured to house the gas generating agent and including a gas discharge chamber configured to discharge the gas generated from the gas generating agent, wherein each of the ejection sections defining one end and an opposite other end, each ejection section is configured to hold the corresponding flying body at the one end and communicates with the gas discharge chamber through the gas introduction path at the other end, and
each of the extrusion members is accommodated in the corresponding ejection section, and
the movement limiting section limits a range of movement of the corresponding extrusion member within the ejection section.

9. The parachute device according to claim 8, wherein
each of the ejection sections includes:
a first tube-shaped member,
a second tube-shaped member disposed so as to be coaxial with the first tube-shaped member, and
a partition section provided between the first tube-shaped member and the second tube-shaped member, the partition section covering respective end portions of the first tube-shaped member and the second tube-shaped member facing each other, the partition section serving as the movement limiting section,
a corresponding flying body is provided in the first tube-shaped member of the corresponding ejection section,
each of the extrusion members includes a bar-shaped portion and a pressure receiving section comprising a cylindrical body fixed to one end of the bar-shaped portion and configured to receive the thrust force produced by the pressure of the gas, and
the partition section is formed with a through hole whereby the bar-shaped portion of the corresponding extrusion member can pass freely through the through hole but the pressure receiving section of the corresponding extrusion member cannot pass through the through hole.

10. The parachute device according to claim 7, wherein
the gas generating device includes:
a gas generating agent configured to generate the gas, and
a housing configured to house the gas generating agent and including a gas discharge chamber configured to discharge the gas generated from the gas generating agent,
the corresponding extrusion member extends between the gas discharge chamber and the corresponding ejection section,
each of the extrusion members includes:
a bar-shaped portion extending between one end and an opposite other end, the bar-shaped portion capable of being inserted into the corresponding ejection section at the one end, and
a pressure receiving section comprising a cylindrical body fixed to the other end of the bar-shaped portion and disposed in the gas discharge chamber, the pressure receiving section being configured to receive the thrust force produced by the pressure of the gas, and
the movement limiting section is configured to limit the range of the movement of the corresponding extrusion member within the gas discharge chamber.

11. The parachute device according to claim 10, wherein
each housing includes a tube-shaped portion provided for each of the extrusion members, defining the gas discharge chamber, and configured to house the pressure receiving section movably therein, and
each tube-shaped portion is formed with a through hole whereby the bar-shaped portion of the corresponding extrusion member can pass freely through the through hole but the pressure receiving section of the corresponding extrusion member cannot pass through the through hole.

* * * * *